US012681297B1

(12) United States Patent
Pighi

(10) Patent No.: US 12,681,297 B1
(45) Date of Patent: Jul. 14, 2026

(54) ELECTROSTATIC DEBRIS REMOVAL FOR CAMERA LENSES

(71) Applicant: Ambarella International LP, Santa Clara, CA (US)

(72) Inventor: Omar Pighi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 207 days.

(21) Appl. No.: 18/786,020

(22) Filed: Jul. 26, 2024

(51) Int. Cl.
G02B 27/00 (2006.01)
B08B 6/00 (2006.01)

(52) U.S. Cl.
CPC ............ G02B 27/0006 (2013.01); B08B 6/00 (2013.01)

(58) Field of Classification Search
CPC .............................. G02B 27/0006; B08B 6/00
See application file for complete search history.

(56) References Cited

U.S. PATENT DOCUMENTS

2007/0256258 A1 * 11/2007 Takayanagi ............... B08B 5/04
15/310
2018/0013933 A1 * 1/2018 Barton ...................... B08B 6/00

OTHER PUBLICATIONS

Sreedath Panat and Kripa K. Varanasi, "Electrostatic dust removal using adsorbed moisture-assisted charge induction for sustainable operation of solar panels", Science Advances, vol. 8, Issue 10, Published Mar. 11, 2022, DOI: 10.1126/sciadv.abm0078.
Science Direct, "Electrostatic Filter—an overview", Accessed Jun. 12, 2024, https://www.sciencedirect.com/topics/engineering/electrostatic-filter.

* cited by examiner

*Primary Examiner* — James A Dudek
(74) *Attorney, Agent, or Firm* — Maiorana Patent Law, PA

(57) ABSTRACT

An apparatus comprising a cover for a camera sensor, a conductive material, and a power source. The cover for the camera sensor may provide a transparent and conductive coating. The conductive material may be configured to move near the cover. The power source may be configured to apply an electrical charge to the cover and the conductive material. The electrical charge applied to the cover and the conductive material may be configured to generate an electric field between the cover and the conductive material. The cover may implement a first electrode for the electric field and the conductive material may implement a second electrode for the electric field. The electric field may be configured to apply a charge to a plurality of debris on the cover. The charge applied to the plurality of debris may be configured to attract the plurality of debris from the cover to the conductive material.

20 Claims, 14 Drawing Sheets

200

ACCESS CONTROL CAMERAS
100d

ATM CAMERAS
100e

VEHICLE CAMERAS
100c

BULLET CAMERAS
100f

TRAFFIC CAMERAS
100b

DOME CAMERAS
100n

ANPR CAMERAS
100a

Figure 18:
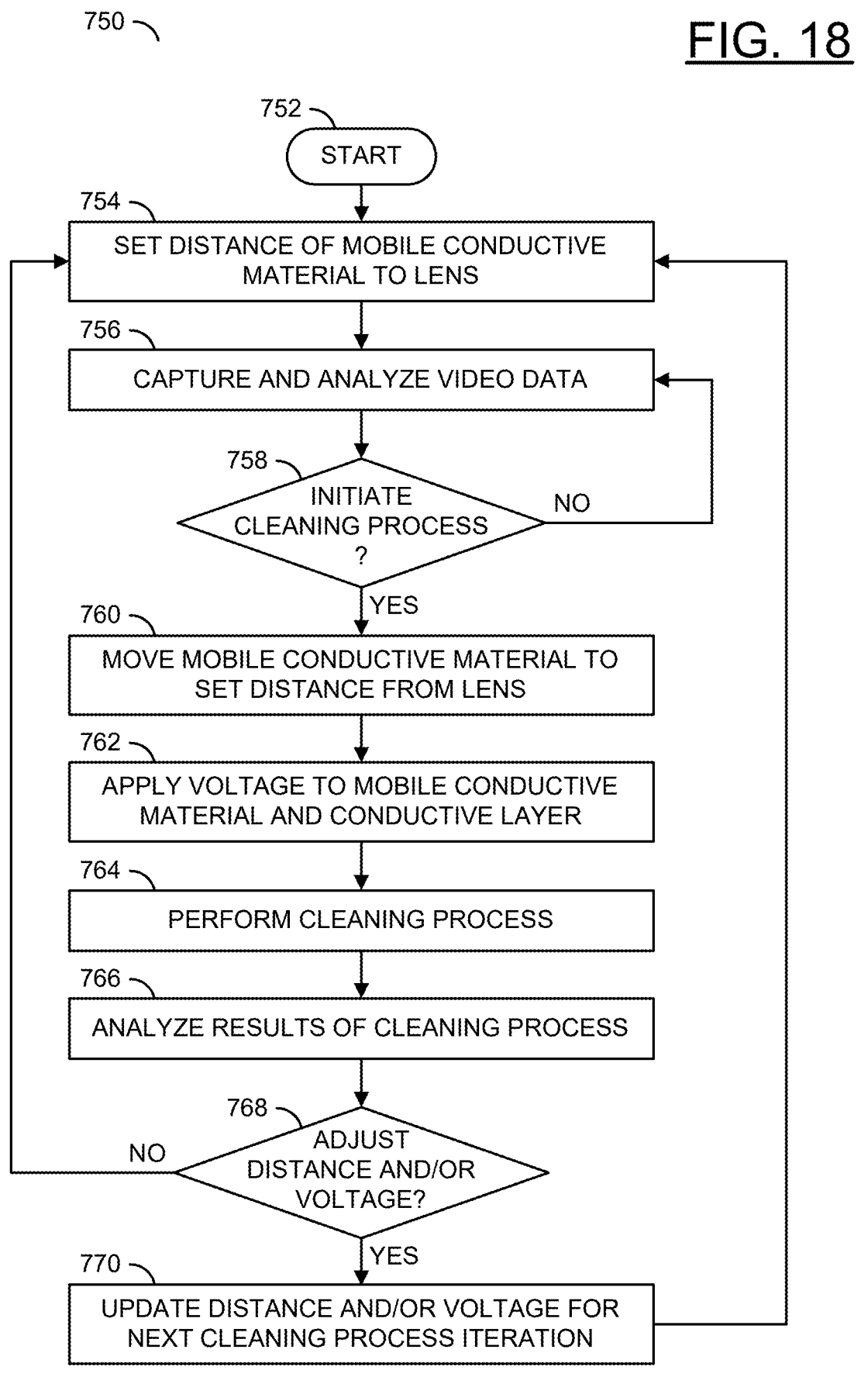

START

754

SET DISTANCE OF MOBILE CONDUCTIVE MATERIAL TO LENS

756

CAPTURE AND ANALYZE VIDEO DATA

758

INITIATE CLEANING PROCESS ?

NO

YES

760

MOVE MOBILE CONDUCTIVE MATERIAL TO SET DISTANCE FROM LENS

762

APPLY VOLTAGE TO MOBILE CONDUCTIVE MATERIAL AND CONDUCTIVE LAYER

764

PERFORM CLEANING PROCESS

766

ANALYZE RESULTS OF CLEANING PROCESS

768

ADJUST DISTANCE AND/OR VOLTAGE?

NO

YES

770

UPDATE DISTANCE AND/OR VOLTAGE FOR NEXT CLEANING PROCESS ITERATION

ELECTROSTATIC DEBRIS REMOVAL FOR CAMERA LENSES

FIELD OF THE INVENTION

The invention relates to camera systems generally and, more particularly, to a method and/or apparatus for implementing electrostatic debris removal for camera lenses.

BACKGROUND

Cameras are used for various types of applications, such as surveillance, maneuvering aid (i.e., driver assistance) or autonomous driving. A surveillance camera that cannot clearly capture an image has limited usefulness. Autonomous vehicles will have a limited ability to detect objects without clear images. Camera lenses, particularly for cameras located in outdoor environments, can be exposed to various types of debris. Debris (i.e., dirt, dust, rain drops, snow, etc.) can obscure the images captured by a camera.

If not removed, dirt and debris in general have a tendency to deposit over the external surface of the most external element of the camera lens causing a degradation of the image quality provided by the camera. Usually, the result of debris on the lens is the presence of a blurred/obscured area in the image taken by the camera that makes distinguishing the content of the covered image portion difficult or impossible. Difficulty distinguishing content can be a problem for both artificial vision systems and humans that need to interpret the image content for various purposes (i.e., detecting a potential threat in the area surveilled by the camera, parking a car near a location of an obstacle captured by a camera mounted on a vehicle, etc.).

There are several conventional methods for cleaning lenses. A wiper or other mechanical action may be installed on the front glass of a camera enclosure, or on the lens. However, using a wiper could damage coatings of the lens, which degrades performance. A nozzle to spray a liquid, air, or a mixture of liquid and air on the lens surface can be used to remove debris. A nozzle also involves an extra external component as well as a tank or compressor to distribute the liquid or gas. For cleaning using water, a large tank is used, which takes up a large amount of space. A high pressure and high flux water pump also consumes a large amount of power. The liquid or gas used can also result in image distortion (and might need a wiper to clear the liquid). A rotating glass in front of the lens can remove debris using a centrifugal force. A rotating glass is also another external element that can cause image distortion. A glass element in front of the lens can also result in reflections, which further cause distortions to the captured image.

It would be desirable to implement electrostatic debris removal for camera lenses.

SUMMARY

The invention concerns an apparatus comprising a cover for a camera sensor, a conductive material, and a power source. The cover for the camera sensor may provide a transparent and conductive coating. The conductive material may be configured to move near the cover. The power source may be configured to apply an electrical charge to the cover and the conductive material. The electrical charge applied to the cover and the conductive material may be configured to generate an electric field between the cover and the conductive material. The cover may implement a first electrode for the electric field and the conductive material may implement a second electrode for the electric field. The electric field may be configured to apply a charge to a plurality of debris on the cover. The charge applied to the plurality of debris may be configured to attract the plurality of debris from the cover to the conductive material.

BRIEF DESCRIPTION OF THE FIGURES

Embodiments of the invention will be apparent from the following detailed description and the appended claims and drawings.

FIG. 18 is a flow diagram illustrating a method for learning a position for a mobile conductive material and a voltage for debris removal.

DETAILED DESCRIPTION OF THE EMBODIMENTS

Figure 1:
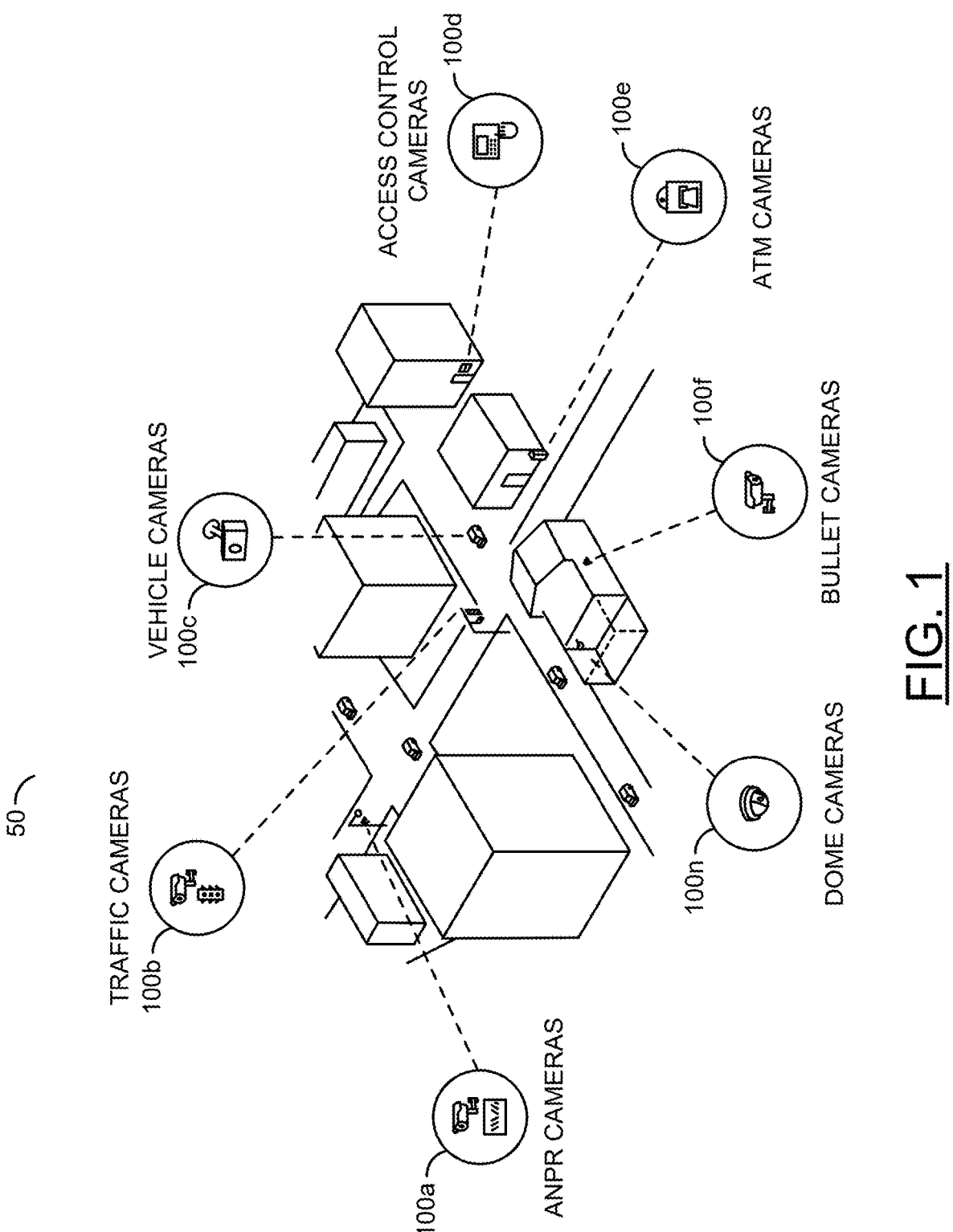
FIG. 1 is a diagram illustrating examples of internet protocol cameras that may implement electrostatic debris removal for camera lenses in accordance with example embodiments of the invention.

Embodiments of the present invention include providing electrostatic debris removal for camera lenses that may (i) enable an electric field configured to remove debris from a surface, (ii) provide debris removal without physical contact with a lens and/or lens cover, (iii) enable debris removal without a large water tank or water pump, (iv) apply nebulized water to a lens/cover in response to detecting a dry environment, (v) enable lens cleaning in response to detecting debris using computer vision operations, (vi) enable manual and/or timed lens cleaning, (vii) implement a transparent coating as one conductor and move a second conductor over the lens/cover to create an electric field, (viii) temporarily block a portion of a field of view of an image sensor during a cleaning process, (ix) implement two conductive materials on each side of a lens/cover to create an electric field, and/or (x) be implemented as one or more integrated circuits.

Embodiments of the present invention may be configured to implement a cleaning system for a camera lens and/or camera lens cover. Debris (e.g., mud, dust, snow, water, etc.) may collect on a lens/cover over time. In one example, camera systems implemented on a vehicle may accumulate dirt and mud debris on camera lenses, which may affect driver assistance and/or autonomous driving features. In another example, static cameras (e.g., surveillance cameras), even in indoor uses, may accumulate dirt and dust, which may affect computer vision operations and/or prevent clear recordings. The cleaning system may be configured to remove the debris from the camera lens and/or lens cover. The cleaning system may be configured to implement electrostatic debris removal for camera lenses and/or lens covers. The type of debris removed and/or the type of camera system that implements the electrostatic debris removal may be varied according to the design criteria of a particular implementation.

In some embodiments, the electrostatic cleaning system may comprise a transparent and conductive coating. The coating may be applied to the camera lens and/or the lens cover. The transparent coating may enable the image sensor to capture light without adding distortion. For example, the transparent coating may not affect the capture of pixel data by the image sensor. The conductive feature of the coating may enable the coating to provide a conductive layer to the lens and/or lens cover. For example, the conductive layer may implement an electrode when a power source is applied. When a power source is applied to the conductive layer of the coating, the coating may be configured as an electrode (e.g., a bottom electrode).

The electrostatic cleaning system may further comprise a movable (e.g., mobile) conductive material. The mobile conductive material may be configured to be moved across the camera lens and/or lens cover. In one example, the mobile conductive material may be an aluminum metal block. The mobile conductive material may implement an electrode when a power source is applied. When a power source is applied to the mobile conductive material, the mobile conductive material may be configured as an electrode (e.g., a top electrode).

When a high voltage is applied between the two electrodes (e.g., the conductive coating and the mobile conductive material), an electric field may be created. Debris particles on the lens/cover may become charged by the electric field (e.g., the debris may acquire the same type of electric charge as the coating). In response to acquiring the same electric charge as the coating, the debris may be attracted by an opposite charge on the conductive material. For example, the debris may be pulled off of the lens and/or lens cover and towards the conductive material.

As the mobile conductive material moves across the lens and/or lens cover, a voltage applied to the conductive layer and the mobile conductive material may be high enough to charge the debris. In an example, the charge created may be strong enough to overcome at least the force of gravity and van der Waals forces of adhesion. The force applied may be perpendicular to the lens and/or lens cover. For example, the upper electrode (e.g., the mobile conductive material) may be moved over (e.g., in front of) the lower electrode (e.g., the conductive layer of the coating). After applying the voltage, the debris may be attracted to the upper electrode and removed from the lower electrode (e.g., the coating on the lens/lens cover).

In order for the conductive material to pull debris from the lens, the conductive material may have to move over the lens. In one example, the conductive material may be moved across the lens and/or lens cover. In another example, the conductive cover may be moved using a circular movement to pass over the lens and/or lens cover (e.g., similar to a propellor and/or a wiper, but without touching the lens surface). The movement of the conductive material may be at a high speed. The high speed of the movement may enable the movement across the lens and/or lens cover to be fast enough to block the field of view of the lens for a short amount of time (e.g., resulting in a marginal effect on video acquisition and/or computation for computer vision). In some embodiments, the conductive material may be small enough to only cover a portion of the field of view of the lens while moving across to remove debris. In some embodiments, the mobile conductive material may be configured to move quickly and be repeated rapidly (e.g., a burst of movement) to keep the lens and/or lens cover clean.

In some embodiments, the electrostatic cleaning system may comprise two movable conductive materials. The two movable conductive materials may each be configured as an electrode implemented on opposite sides of the lens and/or lens cover. To initiate cleaning, both the movable conductive materials may be moved near the lens/lens cover (e.g., moved up, moved aside, etc. depending on the geometry of the system).

When a high voltage is applied between the two electrodes (e.g., the two movable conductive materials), an electric field may be created. Debris particles may become charged by the electric field. In response to acquiring an electric charge, the debris may be attracted to one of the movable conductive materials. For example, the debris may be pulled off of the lens and/or lens cover and towards one side with the movable conductive material. In an example, the charge created may be strong enough to overcome at least the force of gravity and van der Waals forces of adhesion. The force applied may be parallel to the lens and/or lens cover. For example, the force may be applied horizontally across the lens (or vertically across the lens) depending on the orientation of the two movable conductive materials with respect to the lens. After applying the voltage, the debris may be attracted to and/or removed by the positive electrode. Once the debris removal is completed, the two electrodes may be moved away from the lens (e.g., if beneficial in order to enable the lens to capture any portion of the full field of view that may be blocked by the movable conductive materials during the cleaning process). Implementing two of the movable conductive materials may be used as an alternate to providing the transparent conductive coating on the lens/lens cover.

In some embodiments, the electrostatic cleaning system may be initiated automatically in response to performing computer vision configured to detect debris on the camera lens and/or lens cover. Details of the computer vision operations for detecting debris may be described in association with U.S. patent application Ser. No. 17/083,401, filed on Oct. 29, 2020, appropriate portions of which are incorporated by reference. In some embodiments, the electrostatic cleaning system may be configured to be initiated in response to a control signal generated in response to manual input (e.g., an end-user pressing a button and/or a switch to enable cleaning). In some embodiments, the electrostatic cleaning system may be configured to be initiated in response to a control signal generated periodically (e.g., a cyclical time base for activating cleaning). In some embodiments, the electrostatic cleaning system may be configured to detect debris in response to a vision-to-text artificial intelligence (AI) analysis. Details of the vision-to-text AI operations may be described in association with U.S. patent application Ser. No. 18/657,588, filed on May 7, 2024, appropriate portions of which may be incorporated by reference. The method of detecting the debris and/or initiating the electrostatic cleaning system may be varied according to the design criteria of a particular implementation.

Embodiments of the electrostatic cleaning system may be configured to detect a dry environment to provide an increase of the effect of the electrostatic removal. For example, in a dry environment, increasing a humidity level may increase the effect of the electrostatic removal (e.g., the charge on the debris may be increased in response to moisture and/or humidity may provide assistance against forces of adhesion). The electrostatic cleaning system may be configured to add humidity and/or moisture to the debris. In one example, humidity may be added by implementing a low pressure and/or low power pump. The pump may be configured to spray nebulized water over the lens/lens cover.

Spraying nebulized water may enable the water applied to be a small amount of water. For example, instead of implementing a large water tank for spraying water droplets on the lens (e.g., similar to a washing system and/or an antifreeze system), the nebulized water sprayed to increase humidity may be a negligible volume of water consumption. The low volume of water applied to increase humidity may enable a tank with a low volume to be implemented (e.g., occupying a small amount of physical space).

Spraying nebulized water may enable the force of the water applied to be low. For example, instead of implementing a high power liquid pump for forcefully spraying water droplets on the lens (e.g., similar to a washing system), the nebulized water sprayed to increase humidity may be applied with a low amount of force. Generating the nebulized water to increase humidity may enable a liquid pump with a low power to be implemented (e.g., compared to a power draw for implementing a high pressure spray and/or a mechanical sweepers).

Referring to FIG. 1, a diagram illustrating examples of internet protocol cameras that may implement electrostatic debris removal for camera lenses in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100a-100n may be varied according to the design criteria of a particular implementation.

The camera systems 100a-100n may accumulate dirt from the outdoor location area 50. For example, dirt, rain, mud and/or snow may accumulate on the camera systems 100a-100n. Each of the camera systems 100a-100n may be configured to implement the electrostatic cleaning system. In some embodiments, the camera systems 100a-100n may be located in difficult to access locations (e.g., accessible by ladder, in a location with limited space, on a nature trail, etc.). In a difficult to reach location, refilling a water tank and/or providing power to a high powered water pump may be inconvenient.

Figure 2:
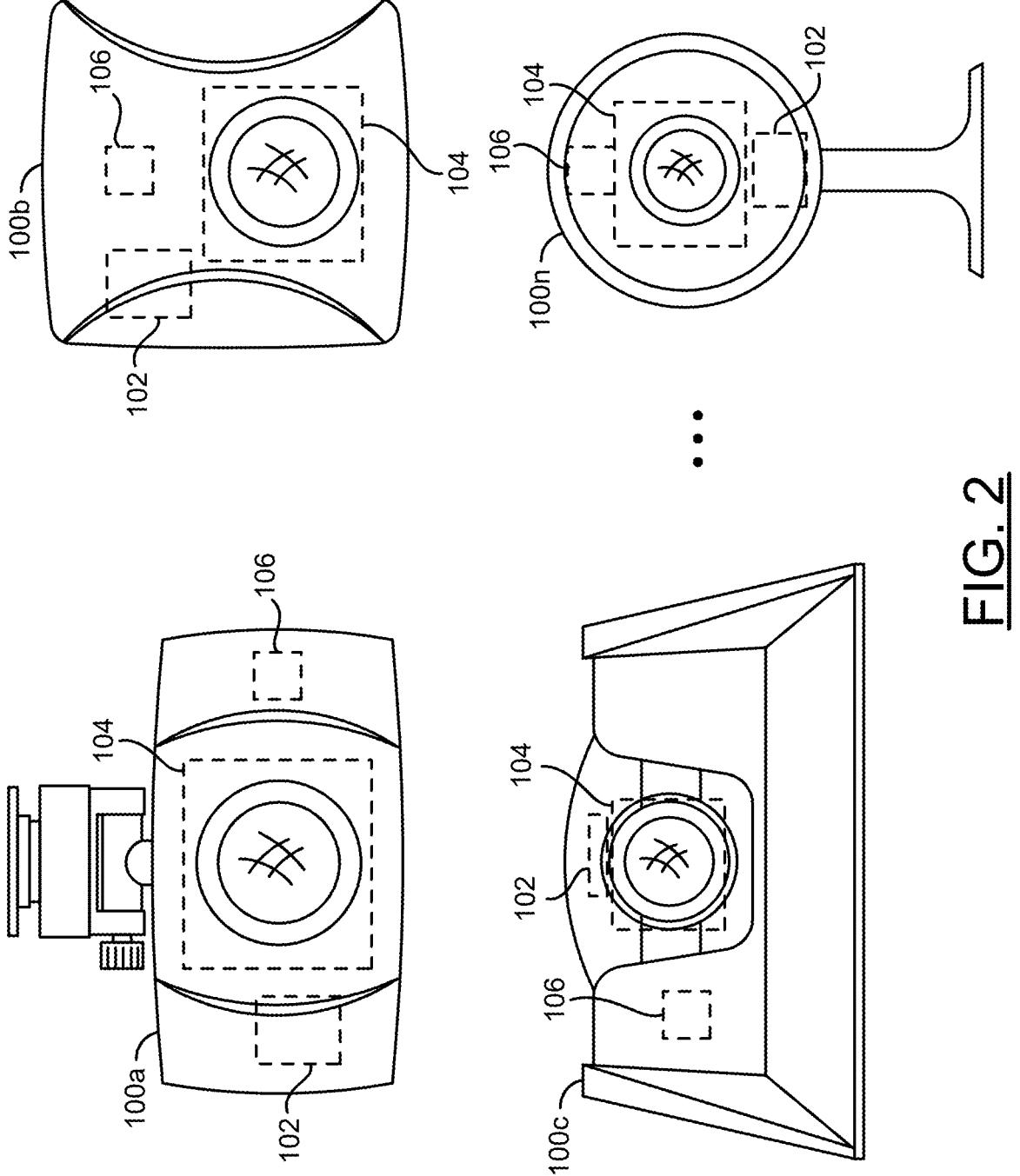
FIG. 2 is a diagram illustrating example edge device cameras.

Referring to FIG. 2, a diagram illustrating example edge device cameras is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). In some embodiments, the camera systems 100a-100n may be stationary cameras (e.g., installed and/or mounted at a single location). In some embodiments, the camera systems 100a-100n may be handheld cameras. In some embodiments, the camera systems 100a-100n may be configured to pan across an area, may be attached to a mount, a gimbal, a camera rig, etc. The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement an inertial measurement unit (IMU).

The camera systems 100a-100n may comprise other components (not shown). Details of the components of the cameras 100a-100n may be described in association with FIG. 4.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100a-100n are shown without implementing a structured light projector, some of the cameras 100a-100n may be implemented with a structured light projector (e.g., cameras that implement a sensor that capture IR light).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding, electronic image stabilization and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
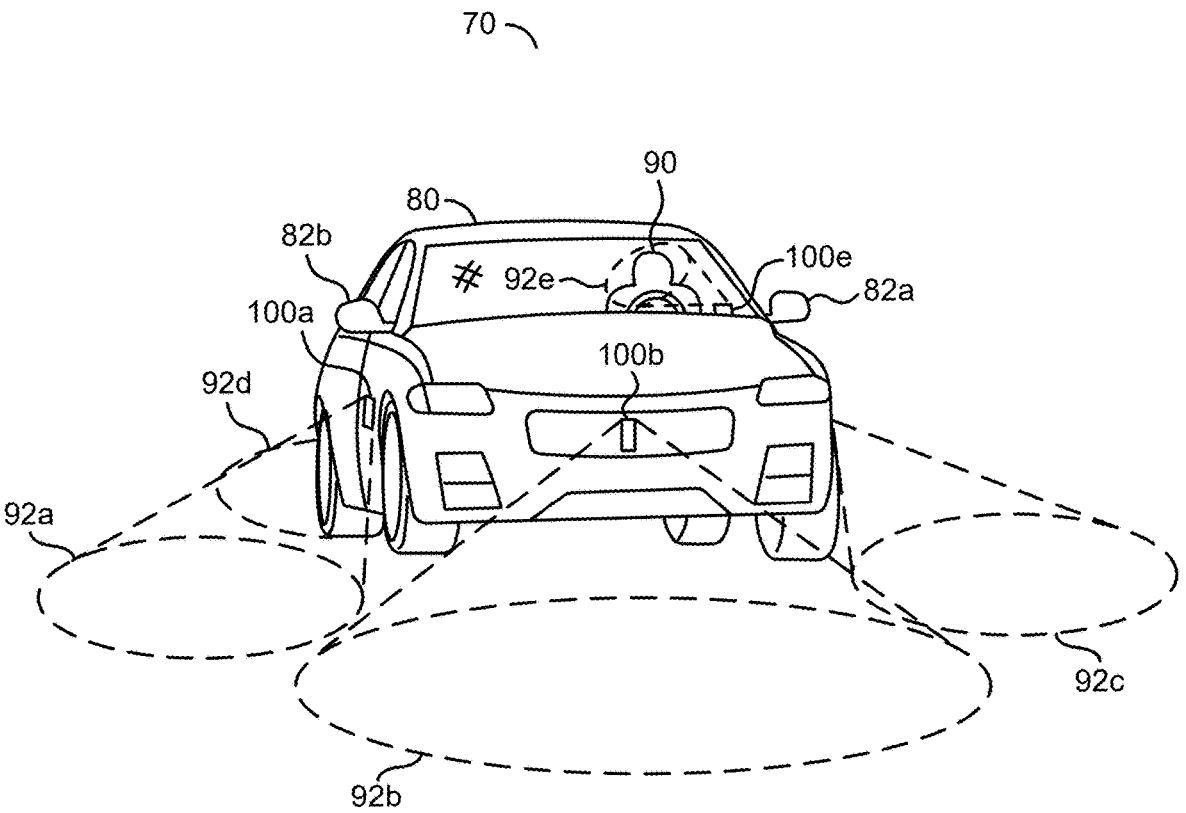
FIG. 3 is a diagram illustrating an example embodiment of the present invention configured to provide an all-around view of a vehicle.

Referring to FIG. 3, a diagram illustrating an example embodiment of the present invention configured to provide an all-around view of a vehicle is shown. An external environment 70 with a vehicle 80 is shown. In the example shown, the vehicle 80 may be a personal vehicle. In one example, the vehicle 80 may be a commercial vehicle (e.g., package delivery, a service van, a public transport van, etc.). In some embodiments, the vehicle 80 may be a commercial truck (e.g., a semi-trailer truck). In some embodiments, the vehicle 80 may be a pickup truck (e.g., a light duty vehicle, a medium duty vehicle, a heavy duty vehicle, etc.). In some embodiments, the vehicle 80 may be a commuter and/or home use vehicle (e.g., a family vehicle such as a sedan, a minivan, a SUV, a crossover, etc.). The vehicle 80 may be an internal combustion engine (ICE) vehicle, a diesel vehicle, a hybrid electric vehicle, a battery electric vehicle, etc. The type of the vehicle 80 implemented may be varied according to the design criteria of a particular implementation.

External side view mirrors 82a-82b are shown on the vehicle 80. The side view mirror 82a may be a side view mirror on the driver side of the vehicle 80. The side view mirror 82b may be a side view mirror on the passenger side of the vehicle 80. A driver 90 is shown in the interior of the vehicle 80. The vehicle 80 may comprise devices 100a-100n. The devices 100a-100n may be camera systems. Camera systems 100a-100b are shown integrated as part of the vehicle 80. The camera system 100a is shown on a passenger side of the vehicle 80. The camera system 100a is shown below the passenger side view mirror 82b. The camera system 100b is shown on the front grille of the vehicle 80. In the perspective of the vehicle 80 shown, three of the camera systems 100a-100b and 100e may be visible. However, one of the camera systems 100a-100n may be implemented at a level below the driver side view mirror 82a (not visible from the perspective of the external view shown). Other camera systems 100a-100n may be located throughout the exterior and/or interior of the vehicle 80. The camera systems 100a-100n may be configured to capture an all-around view of the environment 70 near the vehicle 80.

Dashed lines 92a-92e are shown. In the example shown, the dashed lines 92a are shown extending from the camera system 100a and the dashed lines 92b are shown extending from the camera system 100b towards the exterior of the vehicle. The dashed lines 92c-92d may similarly extend from respective camera systems 100c-100d (not visible from the perspective shown). The dashed lines 92a-92d may provide an illustrative representation of fields of view captured by each of the camera systems 100a-100d. The fields of view 92a-92d together may provide an all-around view of the environment near the vehicle 80.

The all-around view 92a-92d is shown. In an example, the all-around view 92a-92d may enable an all-around view (AVM) system. The AVM system may comprise four cameras (e.g., each camera may comprise a combination of one of the camera systems 100a-100n and/or a stereo pair of the lenses implemented by the camera systems 100a-100n). In the perspective shown in the environment 70, the camera system 100a and the camera system 100b may each be one of the four cameras and the other two cameras may not be visible. In an example, the camera system 100b may be a camera located on the front grille of the vehicle 80, one of the cameras may be on the rear (e.g., over the license plate), the camera system 100a may be located below the side view mirror 82b on the passenger side and one of the cameras may be located below the side view mirror 82a on the driver side. The arrangement of the cameras may be varied according to the design criteria of a particular implementation.

The dashed lines 92e are shown are shown extending from the camera system 100e towards an interior of the vehicle 80. The camera system 100e may be a cabin monitoring camera system. The camera system 100e may be configured to capture the field of view 92e of the cabin of the vehicle 80. The field of view 92e may be directed towards the driver 90. In some embodiments, the field of view 92e may be directed towards the driver 90 and/or other occupants of the vehicle 80.

In some embodiments, each of the camera systems 100a-100e may be configured to capture pixel data arranged as video frames. In some embodiments, each of the camera systems 100a-100d providing the all-around view 92a-92d and/or the camera system 100e providing the cabin view may implement a fisheye lens (e.g., may capture a video frame with a 180 degree angular aperture). The all-around view 92a-92d is shown providing a field of view coverage all around the vehicle 80. For example, the portion of the all-around view 92a may provide coverage for a passenger side of the vehicle 80, the portion of the all-around view 92b may provide coverage for a front of the vehicle 80, the portion of the all-around view 92c may provide coverage for a driver side of the vehicle 80 and the portion of the all-around view 92d may provide coverage for a rear of the vehicle 80. Each portion of the all-around view 92a-92d may be one field of view of a camera mounted to the vehicle 80. Each portion of the all-around view 92a-92d may be dewarped and stitched together by the video processors to provide an enhanced video frame that represents a top-down view near the vehicle 80. The camera systems 100a-100d may be configured to implement a Bird's Eye View Transformer network (e.g., a deep learning model designed to generate BEV representations from multi-camera images). In an example, the all-around view 92a-92d may be used to provide a representation of a bird's-eye view of the vehicle 80.

The camera systems 100a-100e may provide a representative example of the mechanism for image acquisition. In one example, the camera systems 100a-100e may be implemented as monocular cameras. In another example, the camera systems 100a-100e may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the vehicle 80. In some embodiments, the camera systems 100a-100n may be installed as an aftermarket product. For example, the vehicle 80 may be sold without a camera and one or more of the camera systems 100a-100n may be installed on the vehicle 80. The implementation and/or locations of the camera systems 100a-100e on the vehicle 80 and/or the orientation of the camera systems 100a-100e may be varied according to the design criteria of a particular implementation.

The camera systems 100a-100d may accumulate dirt from the external environment 70. For example, dirt, rain, mud and/or snow may accumulate on the camera systems 100a-100n. The camera system 100e may accumulate dirt from the interior of the vehicle 80. For example, dirt and/or dust may accumulate on the camera system 100e. Each of the camera systems 100a-100e may be configured to implement the electrostatic cleaning system. In some embodiments, the camera systems 100a-100e may be located in difficult to access locations (e.g., built into the body of the vehicle 80). In a difficult to reach location, refilling a water tank and/or providing power to a high powered water pump may be inconvenient. For the cameras located on the exterior of the vehicle 80 (e.g., the camera systems 100a-100d), the debris may accumulate while driving. The driver 90 may be unable to physically clean the camera systems 100a-100d and/or refill a fluid tank while the vehicle 80 is in motion.

Figure 4:
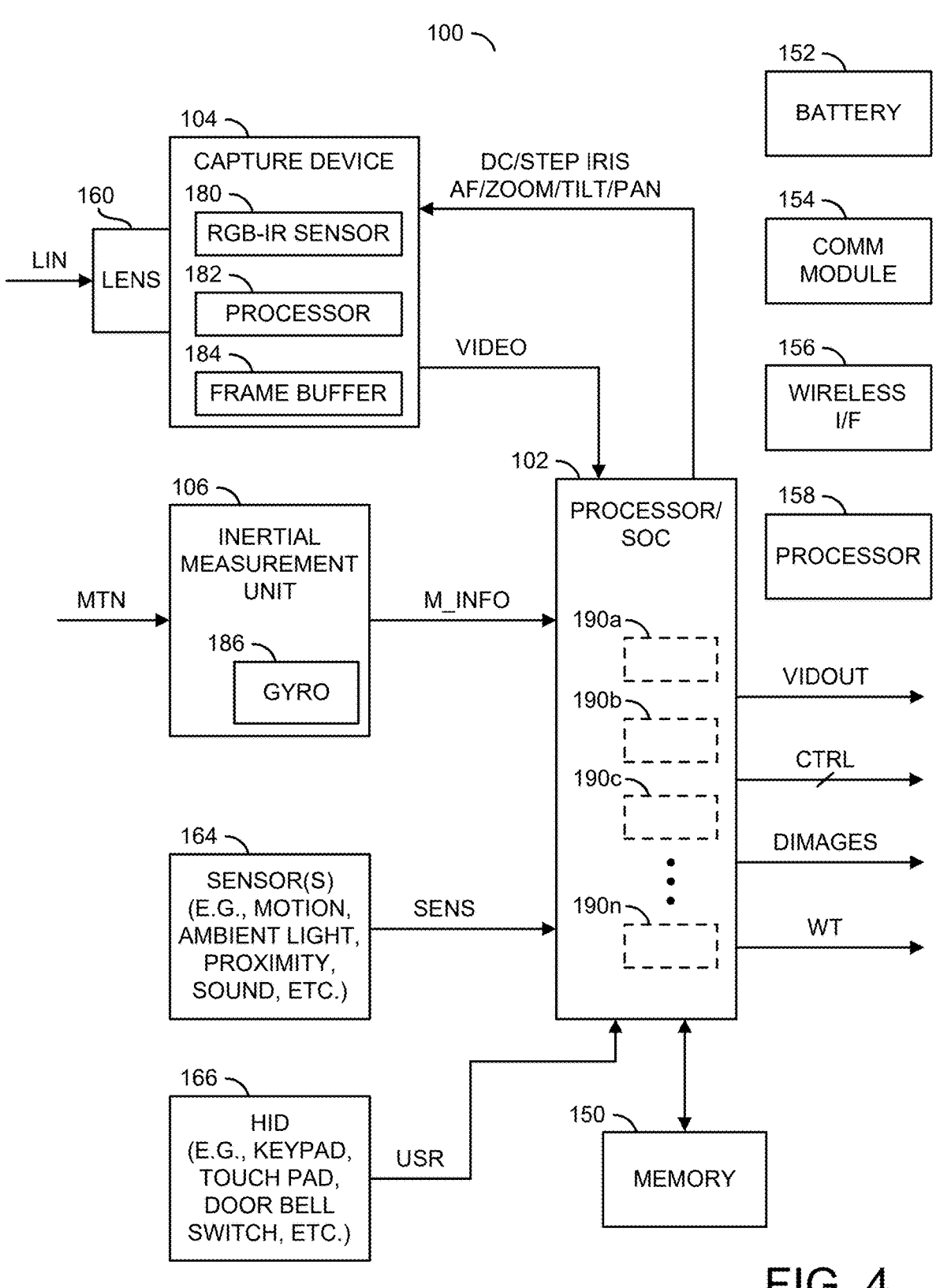
FIG. 4 is a block diagram illustrating a camera system.

Referring to FIG. 4, a block diagram illustrating a camera system is shown. The camera system (or apparatus) 100 may be a representative example of the cameras 100a-100n shown in association with FIG. 2 and/or the cameras 100a-100e shown in association with FIG. 3. The camera system 100 may comprise the processor/SoC 102, the capture device 104, and the IMU 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the IMU 106, the memory 150, the lens 160, the sensors 164, the battery 152, the communication module 154, the wireless interface 156 and the processor 158. In another example, the camera system 100 may comprise processor/SoC 102, the capture device 104, the IMU 106, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). In some embodiments, the processor 158 may implement an integrated digital signal processor (IDSP). For example, the IDSP 158 may be configured to implement a warp engine. Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames).

For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. In some embodiments, the signal VIDEO may be images comprising a background (e.g., objects and/or the environment captured) and the speckle pattern generated by a structured light projector. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The IMU 106 may be configured to detect motion and/or movement of the camera system 100. The IMU 106 is shown receiving a signal (e.g., MTN). The signal MTN may comprise a combination of forces acting on the camera system 100. The signal MTN may comprise movement, vibrations, shakiness, a panning direction, jerkiness, etc. The signal MTN may represent movement in three dimensional space (e.g., movement in an X direction, a Y direction and a Z direction). The type and/or amount of motion received by the IMU 106 may be varied according to the design criteria of a particular implementation.

The IMU 106 may comprise a block (or circuit) 186. The circuit 186 may implement a motion sensor. In one example, the motion sensor 186 may be a gyroscope. The gyroscope 186 may be configured to measure the amount of movement. For example, the gyroscope 186 may be configured to detect an amount and/or direction of the movement of the signal MTN and convert the movement into electrical data. The IMU 106 may be configured to determine the amount of movement and/or the direction of movement measured by the gyroscope 186. The IMU 106 may convert the electrical data from the gyroscope 186 into a format readable by the processor 102. The IMU 106 may be configured to generate a signal (e.g., M_INFO). The signal M_INFO may comprise the measurement information in the format readable by the processor 102. The IMU 106 may present the signal M_INFO to the processor 102. The number, type and/or arrangement of the components of the IMU 106 and/or the number, type and/or functionality of the signals communicated by the IMU 106 may be varied according to the design criteria of a particular implementation.

The sensors 164 may implement a number of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164.

In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

In embodiments of the camera system 100 that implement a structured light projector, the structured light projector may comprise a structured light pattern lens and/or a structured light source. The structured source may be configured to generate a structured light pattern signal (e.g., a speckle pattern) that may be projected onto an environment near the camera system 100. The structured light pattern may be captured by the capture device 104 as part of the light input LIN. The structured light pattern lens may be configured to enable structured light generated by a structured light source of the structured light projector to be emitted while protecting the structured light source. The structured light pattern lens may be configured to decompose the laser light pattern generated by the structured light source into a pattern array (e.g., a dense dot pattern array for a speckle pattern).

In an example, the structured light source may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source may implement a near infrared (NIR) light source. In various embodiments, the light source of the structured light source may be configured to emit light with a wavelength of approximately 940 nanometers (nm), which is not visible to the human eye. However, other wavelengths may be utilized. In an example, a wavelength in a range of approximately 800-1000 nm may be utilized.

The processor/SoC 102 may receive the signal VIDEO, the signal M_INFO, the signal SENS, and the signal USR. The processor/SoC 102 may generate one or more video output signals (e.g., VIDOUT), one or more control signals (e.g., CTRL), one or more depth data signals (e.g., DIM-AGES) and/or one or more warp table data signals (e.g., WT) based on the signal VIDEO, the signal M_INFO, the signal SENS, the signal USR and/or other input. In some embodiments, the signals VIDOUT, DIMAGES, WT and CTRL may be generated based on analysis of the signal VIDEO and/or objects detected in the signal VIDEO. In some embodiments, the signals VIDOUT, DIMAGES, WT and CTRL may be generated based on analysis of the signal VIDEO, the movement information captured by the IMU 106 and/or the intrinsic properties of the lens 160 and/or the capture device 104.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data, the warp table data signal WT and/or the depth data signal DIMAGES comprising disparity maps and depth maps from the signal VIDEO. The video output signal VIDOUT the warp table data signal WT and/or the depth data signal DIMAGES may be presented to the memory 150, the communications module 154, and/or the wireless interface 156. In some embodiments, the video signal VIDOUT the warp table data signal WT and/or the depth data signal DIMAGES may be used internally by the processor 102 (e.g., not presented as output). In one example, the warp table data signal WT may be used by a warp engine implemented by a digital signal processor (e.g., the processor 158).

The signal VIDOUT may be presented to the communication module 154 and/or the wireless interface 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, stabilized video frames, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the IMU 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline, a radar signal processing pipeline and/or an AI processing pipeline. The circuits 190a-190n may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S.

Pat. No. 11,001,231), U.S. patent application Ser. No. 15/593,463, filed on May 12, 2017 ,(now U.S. Pat. No. 10,437,600), U.S. patent application Ser. No. 15/931,942, filed on May 14, 2020 ,(now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 5:
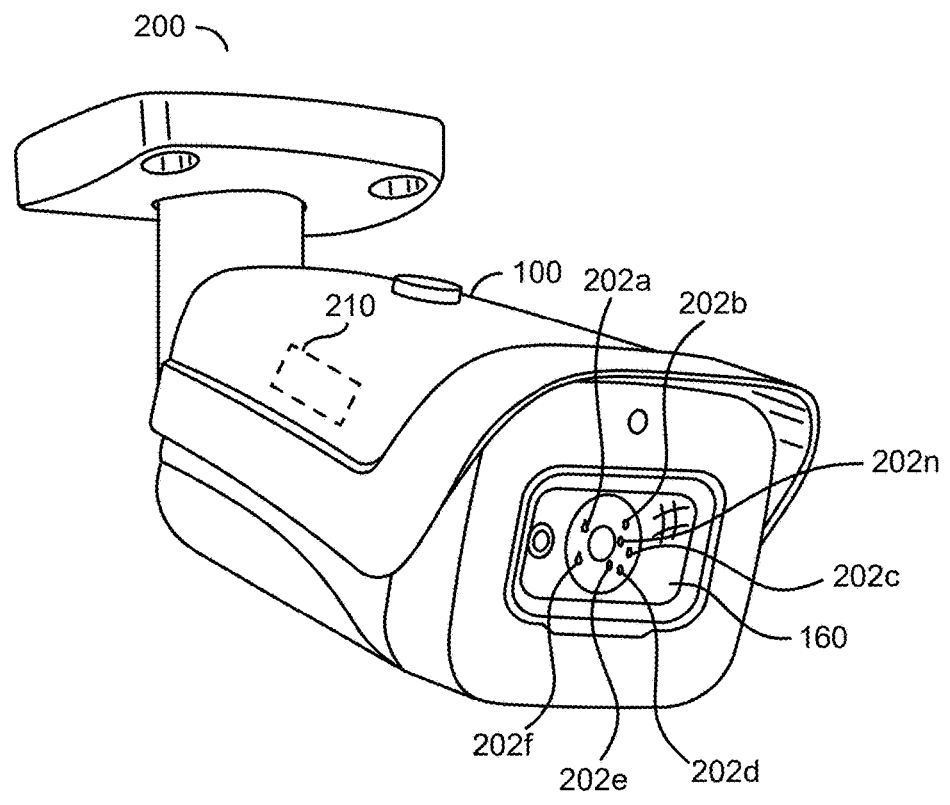
FIG. 5 is a diagram illustrating a camera system with debris on a camera lens/cover.

Referring to FIG. 5, a diagram illustrating a camera system with debris on a camera lens/cover is shown. A view 200 of the camera system 100 is shown. In the example shown, the camera system 100 may be a ceiling mounted camera. For example, for a surveillance/security camera the lens 160 may be an external material of the camera case (e.g., a glass cover, and/or a plastic cover, such as a dome for a ceiling mounted security camera).

Debris 202a-202n is shown. The debris 202a-202n is shown attached to the lens 160. The attached debris 202a-202n may comprise particulate matter. For example, the attached debris 202a-202n may comprise water droplets (e.g., rain drops), snow, sleet, ice, dirt, mud, grime, dust, hair, fur, sand, bugs, etc. The attached debris 202a-202n may obstruct and/or obscure the image data captured by the capture device 104. The type of the attached debris 202a-202n may be varied according to the design criteria of a particular implementation.

The camera system 100 may comprise a block (or circuit) 210. The circuit 210 may implement an electrostatic cleaning system. The electrostatic cleaning system 210 may be configured to remove the attached debris 202a-202n from the lens 160. Details of the electrostatic cleaning system 210 may be described in association with FIG. 6.

Generally, the attached debris 202a-202n may be attached to a most external element (e.g., transparent or translucent element) of the camera system 100 (e.g., a cover). For example, if the lens 160 is enclosed with the camera system behind a plastic (e.g., a protective material) cover, then the attached debris 202a-202n may be attached to the most external plastic cover (e.g., the most external element). Whether the electrostatic cleaning system 210 cleans the attached debris 202a-202n from the lens 160 or another external element may depend on which components of the apparatus 100 are externally located to accumulate the attached debris 202a-202n. Whether the electrostatic cleaning system 210 is configured to directly clean the lens 160 or clean another external element of the camera system 100 may be varied according to the design criteria of a particular implementation.

Figure 6:
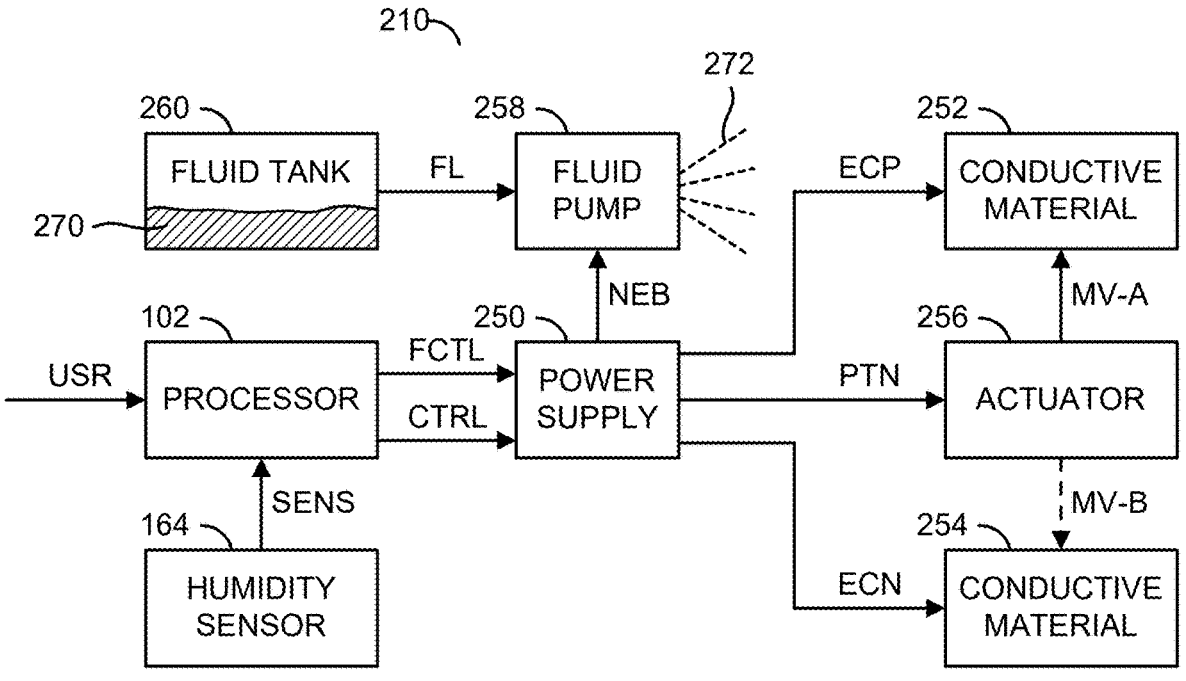
FIG. 6 is a block diagram illustrating an electrostatic cleaning system.

Referring to FIG. 6, a block diagram illustrating an electrostatic cleaning system is shown. The electrostatic cleaning system 210 is shown. The electrostatic cleaning system 210 may comprise the processor 102, the sensor 164, a block (or circuit) 250, a block (or circuit) 252, a block (or circuit) 254, a block (or circuit) 256, a block (or circuit) 258, and/or a block (or circuit) 260. The circuit 250 may implement a power supply. The circuit 252 may implement a conductive material. The circuit 254 may implement a conductive material. The circuit 256 may implement an actuator. The circuit 258 may implement a fluid pump. The block 260 may implement a fluid tank. The electrostatic cleaning system 210 may comprise other components (not shown). The number, type and/or arrangement of the electrostatic cleaning system 210 may be varied according to the design criteria of a particular implementation.

The processor 102 may be configured to control an activation of the electrostatic cleaning system 210. The processor 102 may generate the signal CTRL and/or a signal (e.g., FCTL). The signal CTRL may be a control signal for the electrostatic cleaning system 210. In one example, the signal CTRL may be configured to initiate a generation of an electrostatic field. The signal FCTL may be configured to activate spraying a nebulized fluid. The processor 102 may receive the signal USR and/or the signal SENS. The processor 102 may generate the signal CTRL in response to the signal USR. The processor 102 may generate the signal FCTL in response to the signal SENS. The particular instructions provided in the signal CTRL and/or the signal FCTL may vary based on the input to the processor 102 and/or determinations made by the processor 102.

In some embodiments, the processor 102 may be configured to perform the computer vision operations on the image frames captured. The processor 102 may be configured to analyze the video frames to detect the attached debris 202a-202n on the lens 160. In response to detecting the attached debris 202a-202n, the processor 102 may generate the signal CTRL. In one example, the computer vision operations performed by the processor 102 may detect the attached debris 202a-202n by determining whether objects detected as debris candidates obscure other visual content in video frames (e.g., based on distance measurements). In another example, the processor 102 may perform video frame analysis (e.g., detect video frame characteristics such as contrast, brightness, sharpness, noise, etc.) to detect the attached debris 202a-202n. In yet another example, the processor 102 may implement a deep learning AI model to calculate cleanliness and/or blockage scores to determine whether the attached debris 202a-202n is detected on the lens 160. In still another example, the processor 102 may perform a temporal analysis to determine a consistency of a detected object (e.g., the attached debris 202a-202n may be located at the same location and/or block the same portions on multiple video frames in a sequence of video frames). The type of video analysis performed by the processor 102 to detect the attached debris 202a-202n and/or generate the signal CTRL may be varied according to the design criteria of a particular implementation.

The signal USR may be a signal generated by the HID 166. The HID 166 may generate the signal USR in response to human input (e.g., manual input). In one example, the HID 166 may generate the signal USR in response to a user pressing a button, activating a switch, providing touch input to an infotainment system (e.g., a touchscreen input), providing a voice command, etc. The signal USR may enable the electrostatic cleaning system 210 to be activated in response to a manual input from an end-user. For example, the signal USR may be generated in response to a manual input from an end-user and the signal CTRL may be generated in response to the signal USR. The type of manual input received to activate the electrostatic cleaning system 210 may be varied according to the design criteria of a particular implementation.

In some embodiments, the signal CTRL may be generated by the processor 102 in response to receiving an input from an external (or remote) source. For example, a person monitoring the output video frames (e.g., a security guard watching the video output) may see the attached debris 202a-202n on the output video frames. In one example, the person may connect to the camera system 100 (e.g., via a smartphone companion app) and communicate via the communication module 154. Using the companion app, the person may remotely communicate to enable the processor 102 to generate the signal CTRL.

In some embodiments, the processor 102 may generate the signal CTRL based on a timing interval. In one example, the electrostatic cleaning system 210 may be activated periodically. The processor 102 may track a time interval and generate the signal CTRL at each time interval. For example, the electrostatic cleaning system 210 may be activated every 10 minutes, every hour, every minute, once per day, etc. The particular time period and/or time interval for generating the signal CTRL may be varied according to the design criteria of a particular implementation.

In the example shown, the sensor 164 may implement a humidity sensor. The humidity sensor 164 may be configured to detect an amount of moisture in the environment. To assist in cleaning, a fluid may be applied to the attached debris 202a-202n on the lens 160 when the air is dry. The humidity sensor 164 may be configured to provide data for the processor 102 to determine when to apply the fluid based on the moisture and/or dryness in the air. The humidity sensor 164 may be set to detect a particular level of moisture (e.g., a threshold level of moisture). In response to detecting that the level of moisture in the air is below the threshold level of moisture, the humidity sensor 164 may generate the signal SENS. The processor 102 may generate the signal FCTL in response to the signal SENS. The signal FCTL generated in response to the signal SENS may provide instructions and/or control signals configured to activate the fluid pump 258. The particular level for the threshold level of moisture for activating the signal SENS may be varied according to the design criteria of a particular implementation.

The power supply 250 may be configured to provide power to the various components of the electrostatic cleaning system 210. The power supply 250 may be configured to enable the fluid pump 258 to generate fluid. The power supply 250 may be configured to enable the activation and/or deactivation of the electrostatic field that may remove the attached debris 202a-202n. In some embodiments, the power supply 250 may be implemented as a battery. In some embodiments, the power supply 250 may be implemented as a voltage regulator. In some embodiments, the power supply 250 may be implemented as a power distribution circuit. In some embodiments, the power supply 250 may be implemented as an AC/DC converter. The type of circuitry implementing the power supply 250 may be varied according to the design criteria of a particular implementation.

The power supply 250 may be configured to receive the signal CTRL and/or the signal FCTL. The power supply 250 may be configured to generate a signal (e.g., NEB), a signal (PTN), a signal (e.g., ECP) and/or a signal (e.g., ECN). The signal NEB may be presented to the fluid pump 272. The signal NEB may be configured to activate/deactivate the fluid pump 272. The signal PTN may be presented to the actuator 256. The signal PTN may be configured to provide power to and/or control the movement of the actuator 256. In some embodiments, the signal PTN may be generated by the processor 102 to control a movement of the actuator 256 and the power supply 250 may provide power to the actuator 256 (e.g., for illustrative purposes, the signal PTN is shown provided by the power supply 250). The signal ECP may be presented to the conductive material 252 (or the conductive material 254). The signal ECP may comprise a positive electric charge. The signal ECN may be presented to the conductive material 254 (or the conductive material 252). The signal ECN may comprise a negative electric charge. The signal ECN and/or the signal ECP may be configured to provide a charge to the conductive materials 252-254 and/or generate the electrical field. The signal CTRL and/or the signal FCTL may be configured to control the output of the power supply 250. The signal NEB may be generated in response to the signal FCTL. The signal PTN, the signal ECP and/or the signal ECN may be generated in response to the signal CTRL. The number, type and/or format of the signals generated and/or received by the power supply 250 may be varied according to the design criteria of a particular implementation.

The conductive material 252 may be a mobile conductive material. The mobile conductive material 252 may be one of the electrodes for generating the electric field. The mobile conductive material 252 may be configured to receive the signal ECP (or the signal ECN). The mobile conductive material 252 may be configured to receive an electrical charge opposite to the polarity of the electrical charge of the conductive material 254. Whether the mobile conductive material 252 receives the negative charge or the positive charge may be varied according to the design criteria of a particular implementation.

The conductive material 252 may be configured to receive a force MV-A. The force MV-A may be configured to adjust a position, angle and/or orientation of the conductive material 252. For example, the actuator 256 may move the conductive material 252 near the lens 160. The force MV-A may be configured to move the conductive material 252 to enable the conductive material 252 to collect the debris 202a-202n. The conductive material 252 may be implemented using a material capable of conducting electricity. In one example, the conductive material 252 may be a copper material. In another example, the conductive material 252 may be an aluminum material. In yet another example, the conductive material 252 may be an iron material. In some embodiments, the conductive material 252 may comprise a plastic material with a conductive surface (e.g., a surface facing the lens 160 may be conductive). The type of material implemented by the conductive material 252 may be varied according to the design criteria of a particular implementation.

In some embodiments, the conductive material 254 may be a conductive layer. For example, the conductive material 254 may be a coating applied to the lens 160 and/or the lens cover. The conductive material 254 may be a transparent material. For example, the conductive material 254 may be configured to pass through the light input LIN without affecting (or not affecting significantly) the light input. The conductive material 254 may be configured to receive the signal ECN (or the signal ECP). The conductive material 254 may be configured to receive an electrical charge opposite to the polarity of the electrical charge of the conductive material 252. Whether the conductive material 254 receives the negative charge or the positive charge may be varied according to the design criteria of a particular implementation.

In some embodiments, the conductive material 254 may have a similar implementation as the mobile conductive material 252. For example, both the conductive material 252 and the conductive material 254 may be movable conductive materials configured to move near the lens 160. The conductive material 254 may receive the force MV-B applied by the actuator 256 to move near the lens 160 and/or be aligned with the conductive material 252 to create the electric field across the lens 160 to remove the debris 202a-202n from the lens 160.

The actuator 256 may be configured to enable the conductive material 252 and/or the conductive material 254 to move. In one example, the actuator 256 may generate a mechanical force in response to the signal PTN. For simplicity, the signal PTN is shown representing power and position information as a single input. In some embodiments, power from the power supply 250 and/or position input (e.g., from the processor 102) may be separate inputs. The signal PTN may be configured to select a location to move the conductive materials 252-254 and/or select an amount of movement for the conductive materials 252-254. In one example, the actuator 256 may be implemented as a step motor. In another example, the actuator 256 may be implemented as a servo motor. In yet another example, the actuator 256 may be implemented as a DC motor. The implementation of the actuator 256 may be varied according to the design criteria of a particular implementation.

The actuator 256 may be configured to generate the force MV-A and/or the force MV-B in response to the signal PTN. The signal PTN may provide data and/or a voltage that indicates an amount of force to generate for either the conductive material 252, the conductive material 254 or both. The actuator 256 may move the conductive material 252 in a position to enable the conductive material 252 to create an electric field with the conductive material 254.

The fluid pump 258 may be configured to emit a liquid spray 272. The fluid pump 258 may be a nebulizer. The fluid pump 258 may be a low power, low pressure device. For example, the liquid spray 272 may comprise a nebulized fluid. The nebulized fluid 272 may be sprayed on the lens 160. The amount of pressure generated by the fluid pump 258 to emit the nebulized fluid 272 may be low.

The fluid tank 260 may comprise a container and/or a reserve for a fluid 270. The fluid tank 260 may have a relatively small capacity. The fluid pump 258 may enable a fluid draw FL from the fluid tank 260. For example, the fluid pump 258 may enable the fluid draw FL to pull the fluid 270 from the fluid tank 260, then nebulize the fluid 270 to generate the liquid spray 272. In one example, the fluid 270 may be water. In another example, the fluid 270 may be a cleaning solution. In yet another example, the fluid 270 may be an antifreeze. The type of the fluid 270 implemented and/or the capacity of the fluid tank 260 may be varied according to the design criteria of a particular implementation.

The fluid pump 258 may receive the signal NEB. The power supply 250 may generate the signal NEB in response to the signal FCTL. The signal FCTL may be configured to enable the signal NEB in response to the signal SENS generated by the humidity sensor 164. The fluid pump 258 may be enabled in response to the signal NEB. For example, the fluid pump 258 may activate to initiate the fluid draw FL from the fluid tank 260 in response to the signal NEB. The fluid pump 258 may emit the fluid spray 272 onto the lens 160 (and the attached debris 202a-202n) in response to the signal NEB.

Figure 7:
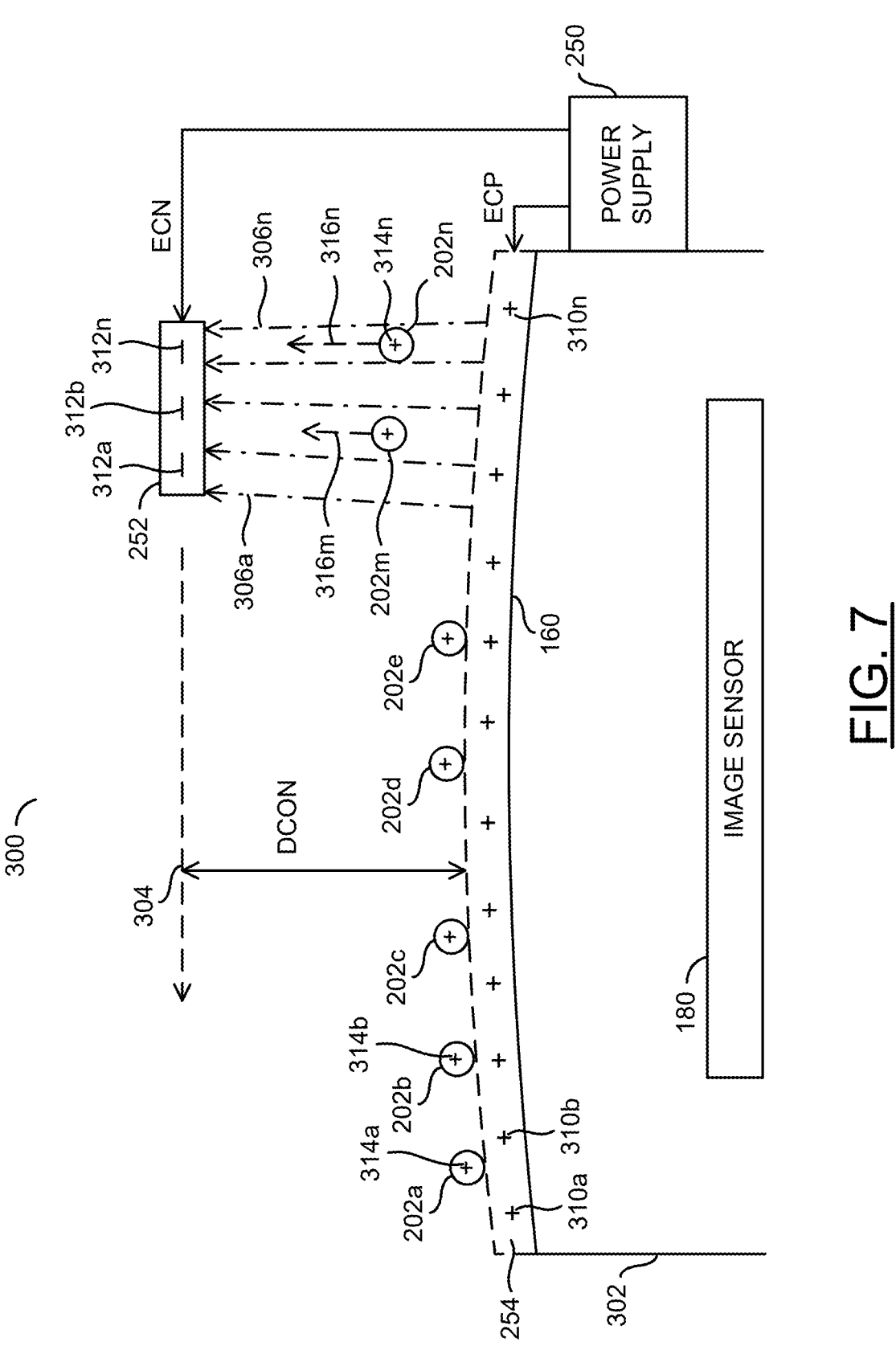
FIG. 7 is a diagram illustrating electrostatic debris removal using a conductive coating.

Referring to FIG. 7, a diagram illustrating electrostatic debris removal using a conductive coating is shown. An example lens coating embodiment 300 is shown. The lens coating embodiment 300 may comprise a lens barrel 302. The lens 160 may be at an end of the lens barrel 302. The image sensor 180 may be within the lens barrel 302. The image sensor 180 may be behind the lens 160 (e.g., below the lens 160 in the example orientation shown). The conductive layer 254 is shown on top of the lens 160. The power supply 250 is shown attached to the lens barrel 302. The mobile conductive material 252 is shown in front of the lens 160 (e.g., above the lens 160 in the example orientation shown). A dotted arrow 304 is shown. The dotted arrow 304 may represent a movement direction of the mobile conductive material 252. For example, the mobile conductive material 252 may be in motion in the movement direction 304 (e.g., moving across the lens 160).

The debris 202a-202n is shown in front of the lens 160 (e.g., above the lens 160 in the example orientation shown). For example, the debris 202a-202n may block and/or distort the light input LIN from passing through the lens 160 and reaching the image sensor 180. The electrostatic cleaning system 210 shown in the lens coating embodiment 300 may be configured to remove the debris 202a-202n from the lens 160.

Dashed arrows 306a-306n are shown extending from the conductive layer 254 to the mobile conductive material 252. The dashed arrows 306a-306n may represent an electric field. The electric field 306a-306n may be created between the mobile conductive material 252 and the conductive layer 254 in response to a difference in charge on the mobile conductive material 252 and the conductive layer 254. The power supply 250 is shown providing the signal ECP to the conductive layer 254 and the signal ECN to the mobile conductive material 252. In the example shown, the signal ECP may provide a positive charge to the conductive layer 254 and a negative charge to the mobile conductive material 252. For example, the electric field 306a-306n may be generated in response to the difference between the positive charge on the conductive layer 254 and the negative charge on the mobile conductive material 252.

The conductive layer 254 may be a transparent material. For example, the conductive layer 254 may enable the light input LIN to pass through the lens 160 and onto the image sensor 180 with no (or negligible) distortion. In some embodiments, the processor 102 may be configured to apply corrections (e.g., dewarping) to correct any distortions caused by the conductive layer 254 (e.g., warp tables may be determined during manufacturing to determine any distortion caused by characteristics of the lens 160 and/or the conductive layer 254, as described in U.S. patent application Ser. No. 17/721,392, filed on Apr. 15, 2022, appropriate portions of which are incorporated by reference). The conductive layer 254 may be configured to conduct electricity. The conductive layer 254 may receive the signal ECP from the power supply 250. Positive charges 310a-310n are shown accumulating on the conductive layer 254. The positive charges 310a-310n applied to the conductive layer 254 may enable the conductive layer 254 to act as an electrode (e.g., a bottom electrode in the perspective shown). The amount of the positive electric charge 310a-310n applied to the conductive layer 254 may be varied according to the design criteria of a particular implementation.

The mobile conductive material 252 may be configured to receive the signal ECN from the power supply 250. Negative charges 312a-312n are shown accumulating on the mobile conductive material 252. The negative charges 312a-312n applied to the mobile conductive material 252 may enable the mobile conductive material 252 to act as an electrode (e.g., a top electrode in the perspective shown). The amount of negative charge 312a-312n applied to the mobile conductive material 252 may be similar to the amount of positive charge 310a-310n applied to the conductive layer 254. The amount of negative charge 312a-312n applied to the mobile conductive material 252 may be varied according to the design criteria of a particular implementation.

The electric field 306a-306n may be generated in response to the high voltage (e.g., the signal ECP and the signal ECN) applied to the conductive layer 254 and the mobile conductive material 252. The electric field 306a-306n may be generally localized to the section of the lens 160 where the mobile conductive material 252 is located. In the example shown, the mobile conductive material 252 may be located towards a right side of the lens 160, and the electric field 306a-306n may be located at the right side of the lens 160. As the mobile conductive material 252 moves across the lens 160, according to the movement 304, the electric field 306a-306n may move across the lens 160.

The debris 202a-202n may acquire the charges 314a-314n. The charges 314a-314n acquired by the debris 202a-202n may be the same polarity as the positive charges 310a-310n accumulated on the conductive layer 254. In the example shown, the charges 314a-314n may be a positive charge. However, in some embodiments, the conductive layer 254 may receive a negative charge (e.g., from the signal ECN) and the mobile conductive material 252 may receive a positive charge (e.g., from the signal ECP), and then the charges 314a-314n acquired by the debris 202a-202n may be a negative charge.

The charges 314a-314n on the debris 202a-202n may result in the debris 202a-202n being attracted by the opposite negative charges 312a-312n on the mobile conductive material 252. For example, the debris 202a-202n on the bottom electrode may be attracted to the top electrode. Generally, the charges 314a-314n may be caused by a voltage high enough to charge the debris 202a-202n to overcome gravitational forces and/or van der Waals forces of adhesion. In one example, the voltage may be approximately 10 kV. The amount of voltage applied by the power supply 250 may be varied according to the design criteria of a particular implementation.

Dotted lines 316a-316b are shown extending from the debris 202m-202n. The debris 202m-202n may be the debris within the electric field 306a-306n (e.g., the debris currently located between the conductive layer 254 and the mobile conductive material 252). The dotted lines 316m-316n may represent an attraction force between the positive charges 314m-314n on the debris 202m-202n and the negative charges 312a-312n on the mobile conductive material 252. The debris 202m-202n are shown lifting off of the conductive layer 254 and the lens 160. The debris 202m-202n in the electric field 306a-306n may be pulled from the lens 160 and onto the mobile conductive material 252 to clean the lens 160. For example, in the lens coating embodiment 300, the electric field 306a-306n and/or the attractive force may be perpendicular to the lens 160.

The debris 202a-202e are shown outside of the electric field 306a-306n. The debris 202m-202n within the electric field 306a-306n are shown having the attractive forces 316m-316n pull the debris 202m-202n from the lens 160. The debris 202a-202e not within the electric field 306a-306n may remain on the lens 160. As the movement 304 of the mobile conductive material 252 results in the mobile conductive material 252 moving across the lens 160, the electric field 306a-306n may move across the lens 160. As the electric field 306a-306n moves across the lens 160, the debris 202a-202e may eventually be within the electric field 306a-306n and the attractive forces may pull the debris 202a-202e towards the mobile conductive material 252.

An arrow (e.g., DCON) is shown between the lens 160 and/or the conductive layer 254 and the arrow 304 (representing the position of the mobile conductive material 252 as the mobile conductive material 252 moves across the lens 160). The arrow DCON may represent a distance. The distance DCON may be a distance between the mobile conductive material 252 and the lens 160. The mobile conductive material 252 may generally be offset at the distance DCON away from the lens 160 (e.g., the mobile conductive material 252 may be located the distance DCON in front of the lens 160). The mobile conductive material 252 may not touch the lens 160 and/or the conductive layer 254. For example, the mobile conductive material 252 touching the lens 160 may scratch the lens 160 and/or damage the conductive layer 254. The distance DCON may provide a sufficient amount of space to enable the electric field 306a-306n. The distance DCON may be small enough to enable the debris 202a-202n to travel from the lens 160 to the mobile conductive material 252. For example, the mobile conductive material 252 moving across the lens 160 in the movement direction 304 at the distance DCON may enable removal of the debris 202a-202n without physical contact with the lens 160.

In one example, the distance DCON may be approximately 0.5 cm to 2 cm. The amount of voltage between the mobile conductive material 252 and the conductive layer 254 may be dependent on the distance DCON. In one example, with the distance DCON at approximately 1 cm, the voltage between the mobile conductive material 252 and the conductive layer 254 generated by the power supply 250 may be approximately 10 kV. In some embodiments, the processor 102 may be configured to adjust the distance DCON. For example, the signal the signal PTN may be configured to move the mobile conductive material 252 across the lens 160 (e.g., in the movement direction 304) and/or closer or farther from the lens 160 (e.g., the distance DCON). In one example, the distance DCON may be set manually via user input (e.g., via the signal USR). In another example, the processor 102 may be configured to perform computer vision operations to adjust the distance DCON. For example, the processor 102 may analyze the debris 202a-202n that may be left on the lens 160 after cleaning to determine whether the distance DCON should be adjusted and/or whether the voltage applied should be adjusted. For example, the processor 102 may determine an appropriate balance between the distance DCON, an effectiveness of the cleaning (e.g., based on the amount of debris 202a-202n removed) and power consumption (e.g., the amount of voltage to apply to the mobile conductive material 252 and the conductive layer 254) over time by analyzing the results of the cleaning process (e.g., the processor 102 may learn from each cleaning iteration to determine settings for the distance DCON and the voltage). The amount of the distance DCON and/or the amount of voltage to apply may be varied according to the design criteria of a particular implementation.

Figure 8:
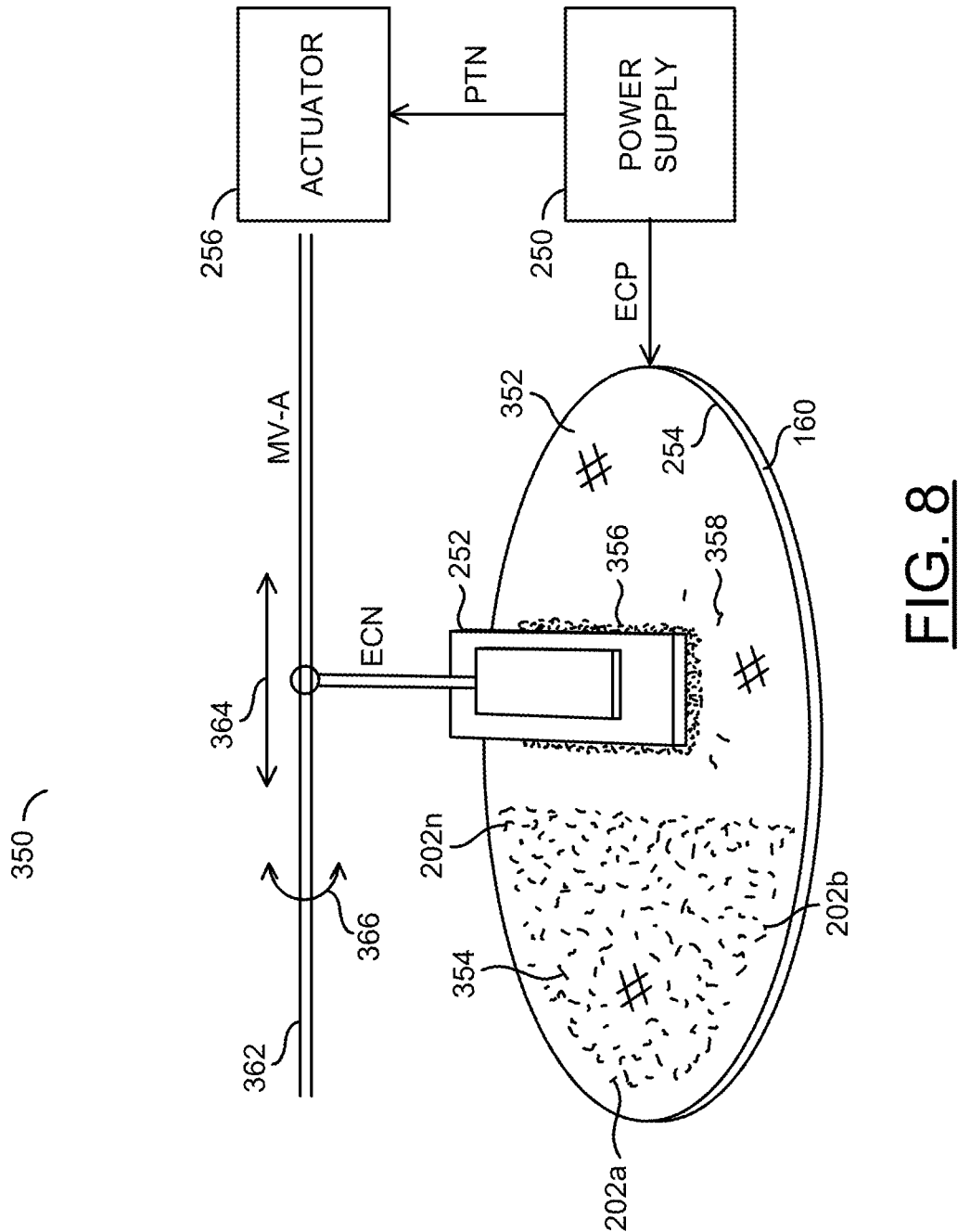
FIG. 8 is a diagram illustrating moving a conductive material across a lens/cover.

Referring to FIG. 8, a diagram illustrating moving a conductive material across a lens/cover is shown. A lens cleaning 350 is shown. The lens cleaning 350 may comprise the lens 160, the debris 202a-202n, the power supply 250, the mobile conductive material 252, the conductive coating 254, and the actuator 256. The power supply 250 may provide the signal ECP to the mobile conductive material 252, the signal ECN to the conductive layer 254 and the signal PTN to the actuator 256. The actuator 256 may provide the force MV-A to move the mobile conductive material 252 across the lens 160 in response to the signal PTN.

The lens cleaning 350 may further comprise a clean portion 352 and an uncleaned portion 354 of the lens 160. The mobile conductive material 252 is shown in a position partway across the lens 160. For example, the lens cleaning 350 may illustrate the cleaning process in progress (e.g., approximately halfway through a pass over the lens 160). The debris 202a-202n is shown on the lens 160 on the uncleaned portion 354. The debris 202a-202n is shown generally removed from the clean portion 352 of the lens 160.

Attracted debris 356 is shown on the mobile conductive material 252. The attracted debris 356 may comprise some of the debris 202a-202n that may have been previously on the clean portion 352 of the lens 160. For example, before the start of the cleaning process, the debris 202a-202n may have been spread all over the lens 160 (e.g., the entire lens 160 may have been the uncleaned portion 354). During the electrostatic cleaning process, the mobile conductive material 252 may sweep over the lens 160 (e.g., at the distance DCON above the lens 160, without touching the lens 160). As the mobile conductive material 252 moves across the lens 160, the debris 202a-202n, which may receive the positive charge applied to the conductive layer 254, may be attracted to the negative charge of the mobile conductive material 252. The debris 202a-202n that may be attracted to the mobile conductive material 252 may be the attracted debris 356. As the attracted debris 356 attaches to the mobile conductive material 252, the portion of the lens 160 that the attracted debris 356 was on, may become the cleaned portion 352 of the lens 160. As the mobile conductive material 252 continues across the lens 160, more of the debris 202a-202n may become the attracted debris 356, and more area of the lens 160 may change from the uncleaned portion 354 to the clean portion 352. The mobile conductive material 252 may move across the entirety of the lens 160 until all of the lens 160 becomes the clean portion 352.

Debris remnants 358 are shown on the clean portion 352 of the lens 160. In some embodiments, the debris remnants 358 may comprise the debris 202a-202n that is in the process of being attracted to the mobile conductive material 252 (e.g., debris in the process of being lifted off of the lens 160). In some embodiments, the debris remnants 358 may comprise the debris 202a-202n that was not attracted to the mobile conductive material 252. For example, every single piece of the debris 202a-202n may not necessarily be pulled from the lens 160 during a single pass of the mobile conductive material 252 across the lens 160. For example, the cleaning process may comprise more than one pass of the mobile conductive material 252 across the lens 160 to completely clean the debris 202a-202n from the lens 160. In some embodiments, computer vision operations may be configured to detect the debris remnants 358 after the cleaning process has been completed (or finished) to determine whether or not to adjust the distance DCON and/or adjust the voltage applied to the mobile conductive material 252 and the conductive layer 254. The number of passes by the mobile conductive material 252 during the cleaning process may be varied according to the design criteria of a particular implementation.

An armature 362 is shown extending from the actuator 256. The mobile conductive material 252 may be attached to the armature 362. In some embodiments, the armature 362 may be configured to move the mobile conductive material 252. In some embodiments, the armature 362 may comprise wiring that may enable the transmission of the signal ECN (or the signal ECP) to provide the charge to the mobile conductive material 252. In one example, the armature 362 may be located beside the lens 160 (e.g., above the lens 160, below the lens 160, to the right of the lens 160, to the left of the lens 160, etc.). The armature 362 may be offset from the lens 160 to enable the mobile conductive material 252 to be the distance DCON from the lens 160.

Double-ended arrows 364 are shown. The double-ended arrows 364 may represent a movement direction of the mobile conductive material 252. The movement direction 364 of the mobile conductive material 252 may be bi-directional. For example, the force MV-A may enable the mobile conductive material 252 to move across the armature 362. For example, the signal PTN may enable the force MV-A to move the mobile conductive material 252 from a default position and in a first direction across the lens 160 to an end position, then the signal PTN may enable the force MV-A to move the mobile conductive material 252 from the end position back across the lens 160 to return to the default position. The default position and the end position may be a location where the mobile conductive material 252 is not in front of the lens 160 (e.g., does not block the field of view of the lens 160).

Double-ended arrows 366 are shown. The double-ended arrows 366 may represent another movement direction of the mobile conductive material 252. The movement direction 366 may enable the mobile conductive material to rotate (or flip). For example, the force MV-A may enable the mobile conductive material 252 to move across the lens 160 (e.g., the movement direction 364) and flip in front of the lens 160 or away from the lens 160 (e.g., the movement direction 366). In one example, the armature 362 may be configured to rotate to enable the movement direction 366. The movement direction 366 may enable the movement of the mobile conductive material 252 between the default position and the cleaning position. In one example, the cleaning position may be when the mobile conductive material 252 is in front of the lens 160 (e.g., as shown). In another example, the default position may be when the mobile conductive material 252 is flipped away from the lens 160 (e.g., to prevent blocking the field of view of the lens 160). In an example, after the cleaning process, the mobile conductive material 252 may comprise the attracted debris 356. The actuator 256 may flip the mobile conductive material 252 away from the lens 160 to the default position. When the mobile conductive material 252 is in the default position, the power supply 250 may remove the charge from the mobile conductive material 252 and the attracted debris 356 may fall off the mobile conductive material 252 (e.g., to clean off the mobile conductive material 252 for a next cleaning pass). For example, when in the default position, the attracted debris 356 may be dumped away from the lens 160.

Figure 9:
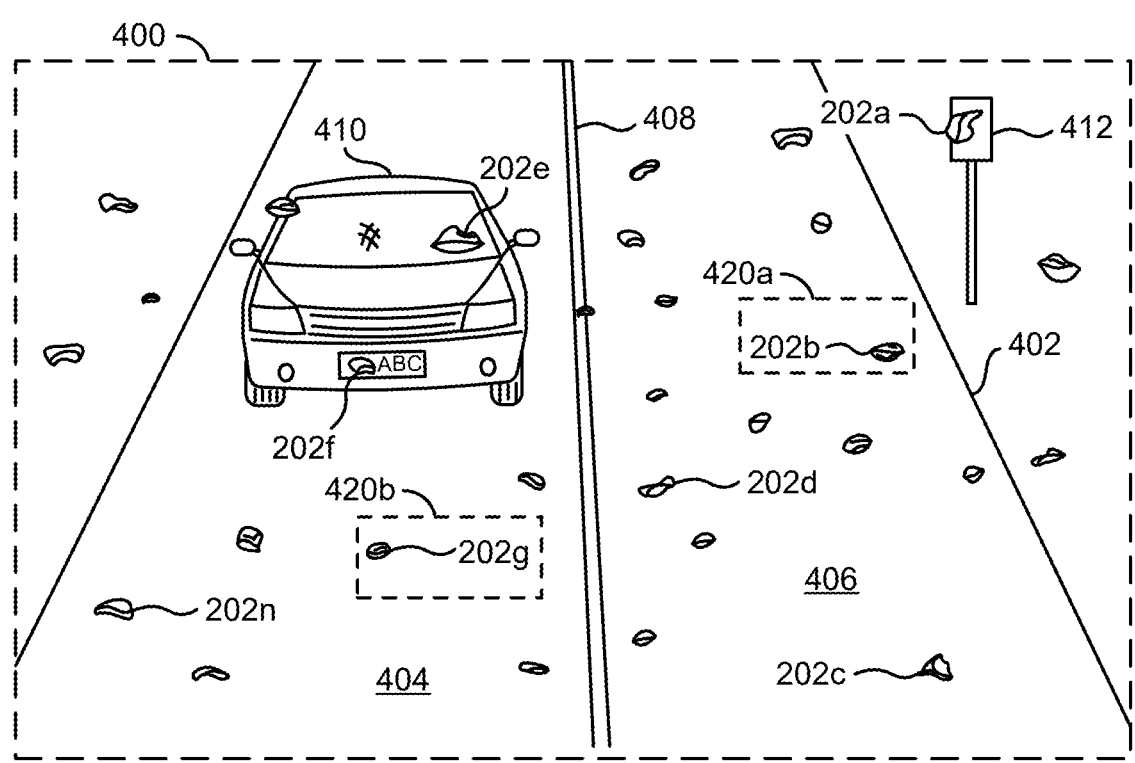
FIG. 9 is a diagram illustrating detecting debris on a lens using computer vision operations.

Referring to FIG. 9, a diagram illustrating detecting debris on a lens using computer vision operations is shown. An example video frame 400 is shown. The example video frame 400 may comprise pixel data captured by the capture device 104. In one example, the video frame 400 may be provided to the processor 102 as the signal VIDEO. In another example, the video frame 400 may be generated by the processor 102 in response to the pixel data provided in the signal VIDEO. The pixel data may be received by the processor 102 and video processing operations may be performed by the video processing pipeline to generate the example video frame 400. In some embodiments, the example video frame 400 may be presented as human viewable video output to one or more video displays. In some embodiments, the example video frame 400 may be utilized internal to the processor 102 to perform the computer vision operations.

The example video frame 400 may comprise a view of a roadway 402. In an example, the example video frame 400 may be captured by one of the camera systems 100a-100n mounted to the vehicle 80 (e.g., a view provided by the all-around view 92a-92d). The roadway 402 may comprise a lane 404 and a lane 406. A lane line 408 may separate the lane 404 and the lane 406. A vehicle 410 is shown in the lane 404. For example, the vehicle 410 may be approaching the vehicle 80 in the opposite lane (e.g., the vehicle 80 may be traveling in the lane 406). A sign 412 is shown beside the lane 406. For example, the sign 412 may provide a speed limit, a road shape warning, a construction warning, etc.

The attached debris 202a-202n is shown in the example video frame 400. In the example shown, the attached debris 202a-202n may comprise dust, dirt, rain drops, etc.. The debris 202a-202n may be attached to the lens 160. Since the debris 202a-202n may be attached to the lens 160, the debris 202a-202n may appear regardless of whether the capture device 104 zooms, pans, tilts, changes direction, etc.

The debris 202a-202n attached to the lens 160 may cover other objects and/or details captured in the example video frame 400. For example, regardless of what appears beyond the debris 202a-202n, the debris 202a-202n may appear in front. The debris 202a-202n may partially and/or totally obscure content in the example video frame 400. For example, the debris 202a-202n may act as a filter effect overlaid on top of anything captured in the video data.

The debris 202a-202n may be undesired content captured. In the example shown, the roadway 402, the vehicle 410 and/or the sign 412 may be desired content captured. The undesired debris 202a-202n may potentially cover the desired video content. For example, the debris 202f may partially cover a license plate of the vehicle 410 and the debris 202a may partially cover the sign 412.

Dotted shapes 420a-420b are shown in the video frame 400. The dotted shapes 420a-420b may represent the detection of an object/subject by the computer vision operations performed by the processor 102. The dotted shapes 420a-420b may comprise the pixel data corresponding to an object detected by the computer vision operations pipeline, the neural network model 190b and/or a video-to-text AI model. In the example shown, the dotted shape 420a may correspond to the debris 202b and the dotted shape 420b may correspond to the debris 202g. For illustrative purposes, only the dotted shapes 420a-420b are shown. However, each of the debris 202a-202n may be detected as an object. In some embodiments, various other types of objects may be detected in response to animal detection, household object detection, interior object detection, person detection, vehicle detection, roadway detection, sky region detection, obstacle detection and/or exterior object detection (e.g., one or more of the neural network 190b and/or video-to-text AI model may comprise libraries configured to detect people, vehicles, objects, animals, etc.). In the example shown, the libraries implemented and/or the training data used to train the AI models may be configured to enable detection and/or description of objects that may be obstructions (e.g., debris) on the lens 160. For example, the libraries implemented may be configured to detect dust particles, mud, ice, snow, rain, scratches, other lens defects, etc. The dotted shapes 420a-420b are shown for illustrative purposes. In an example, the dotted shapes 420a-420b may be visual representations of the object detection (e.g., the dotted shapes 420a-420b may not appear on an output video frame in the signal VIDOUT). In another example, the dotted shapes 420a-420b may be bounding boxes generated by the processor 102 displayed on the output video frames to indicate that an object has been detected (e.g., the dotted shapes 420a-420b may be displayed in a debug mode of operation).

The computer vision operations, debris analysis and/or the video-to-text (or sensor-fusion-to-text) operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 400 is shown, the behavior, movement direction and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding boxes 420a-420b may be regions of interest of a subset of the objects in the video frame 400. The bounding boxes 420a-420b are shown as representative examples of various objects but, generally, many more objects may be detected (e.g., dents, scratches, animals, other people, etc.). In an example, the settings (e.g., the feature set) for the processor 102 (e.g., the computer vision AI neural network model implemented by the CNN module 190*b*, the video-to-text AI) may define objects of interest to be pets, people, storage objects, sporting equipment, tools, supplies, lens obstructions etc.. For example, doorways, ceilings, and/or stairs may not be objects of interest for a feature set defined to detect objects in or near a vehicle. In the example shown, the bounding boxes 420*a*-420*b* are shown having a cubic (or rectangular) shape. In some embodiments, the shape of the bounding boxes 420*a*-420*b* that correspond to the objects of interest detected may be formed to follow the shape of the body of the people detected and/or the shape of the various objects detected (e.g., an irregular shape that follows the curves and/or the body shape of the detected objects).

The processor 102, the CNN module 190*b* and/or the video-to-text AI model may be configured to implement region, animal, lens obstruction, object and/or face detection techniques. In some embodiments, other types of subjects as objects of interest may be detected (e.g., vehicles, passengers, pedestrians, street signs, etc.). The computer vision techniques and/or the video-to-text techniques may be configured to detect the regions of interest (ROIs) of the detected objects 420*a*-420*b* and/or generate the information about the detected objects 420*a*-420*b* and/or the context of the scene generally. For example, the bounding boxes 420*a*-420*b* may be a visual representation of the ROIs detected. The computer vision technique may be looped (e.g., to iteratively perform object/subject detection throughout the example video frame 400) in order to determine if any objects of interest (e.g., as defined by the feature set) are within the field of view of the lens 160 and/or the image sensor 180.

While only the objects 420*a*-420*b* are shown as objects of interest (e.g., the debris 202*a*-202*n*), the computer vision operations and/or the video-to-text operations performed by the processor 102, the CNN module 190*b* and/or the video-to-text AI model may be configured to detect background objects and/or other types of objects. The background objects may be detected for other computer vision purposes (e.g., training data, labeling, depth detection, etc.). The type(s) of subjects identified as the objects of interest 420*a*-420*b* may be varied according to the design criteria of a particular implementation. Details of computer vision, video-to-text operations and/or sensor-fusion-to-text operations may be described in association with U.S. patent application Ser. No. 18/583,298, filed on Feb. 11, 2024, U.S. patent application Ser. No. 18/621,504, filed on Mar. 29, 2024, U.S. patent application Ser. No. 18/657,588, filed on May 7, 2024 and/or U.S. patent application Ser. No. 18/657,492, filed on May 7, 2024, appropriate portions of which are incorporated by reference.

The attached debris 202*a*-202*n* may disrupt the detection of various objects in the example video frame 400. The debris 202*a*-202*n* may prevent various objects from being detected by the CNN module 190*b* and/or details of the objects from being detected (e.g., a license plate of the vehicle 410 may be unreadable). The amount, size and/or density of the attached debris 202*a*-202*n* may result in various objects being able or unable to be detected by the CNN module 190*b*. For example, even a larger object such as the vehicle 410 may be prevented from being detected if the attached debris 202*a*-202*n* creates enough discontinuities, and/or blocks too many identifiable features. For example, even if the CNN module 190*b* is capable of detecting objects despite the presence of the attached debris

202*a*-202*n*, the attached debris 202*a*-202*n* may still limit the amount of information that may be extracted about the detected objects. In the example shown, a windshield may be detected despite the debris 202*a*-202*n*. However, one characteristic detected about the windshield may be the presence and/or number of occupants within the vehicle 410. For example, the processor 102 may detect people within the vehicle 410 to shape the headlight beams to prevent shining headlights at occupants in other vehicles. The debris 202*a*-202*n* may disrupt the detection of the number of occupants within the vehicle 410.

The processor 102 may be configured to detect the presence of the attached debris 202*a*-202*n*. In one example, the processor 102 may perform the object detection to detect whether there is attached debris 202*a*-202*n* on the lens 160. The CNN module 190*b* may be configured to distinguish between objects located in the foreground and objects located in the background. The attached debris 202*a*-202*n* may appear as a foreground object. In some embodiments, the processor 102 may be configured to perform depth analysis. Generally, desired objects may be detected at a distance away from the lens 160. In some embodiments, where the camera system 100 comprises a stereo camera, the attached debris 202*a*-202*n* may not appear with the same pattern and/or arrangement on each stereo pair of images captured (e.g., the location of the debris 202*a*-202*n* may be random and both lenses would likely not have rain drops located at the same positions, which may indicate the presence of the attached debris 202*a*-202*n*).

In some embodiments, the CNN module 190*b* may determine whether the attached debris 202*a*-202*n* obscures and/or distorts the desired objects in the example video frame 400. The type of distortion may indicate the presence of the attached debris 202*a*-202*n*. In some embodiments, the CNN module 190*b* may be configured to track the location of the objects detected over time (e.g., from video frame to video frame over a sequence of captured video frames). The attached debris 202*a*-202*n* may generally remain in a static position as the capture device 104 moves (e.g., when the ego vehicle 80 turns). The attached debris 202*a*-202*n* may generally remain in a static position as other objects in the example video frame 400 move (e.g., the vehicle 410 may move close to the ego vehicle 80, resulting in a change in size, or turn, resulting in a change of position, etc.). The lack of movement of an object over time may indicate that the object is the attached debris 202*a*-202*n*. The methods for detecting the presence of the attached debris 202*a*-202*n* using computer vision operations may be varied according to the design criteria of a particular implementation. Details of obstruction and/or debris detection may be described in association with U.S. patent application Ser. No. 17/083,401, filed on Oct. 29, 2020 (now U.S. Pat. No. 11,531,197, issued on Dec. 20, 2022), appropriate portions of which are incorporated by reference.

Each method for detecting the attached debris 202*a*-202*n* may increase or decrease a likelihood of the processor 102 determining that the attached debris 202*a*-202*n* is present. For example, the more indications that attached debris 202*a*-202*n* is present may increase a confidence level of the detection of the attached debris 202*a*-202*n*. For example, the detection of objects that do not move relative to the movement of the camera and objects that cause a distortion effect on other objects may have a higher confidence level for detecting the attached debris 202*a*-202*n* than only detecting an object that does not move relative to the movement of the camera. When the confidence level of the presence of the attached debris 202*a*-202*n* is greater than a pre-determined threshold, then the processor 102 may generate the signal CTRL to activate the electrostatic cleaning by the power supply 250 and/or other components of the electrostatic cleaning system 210.

Figure 10:
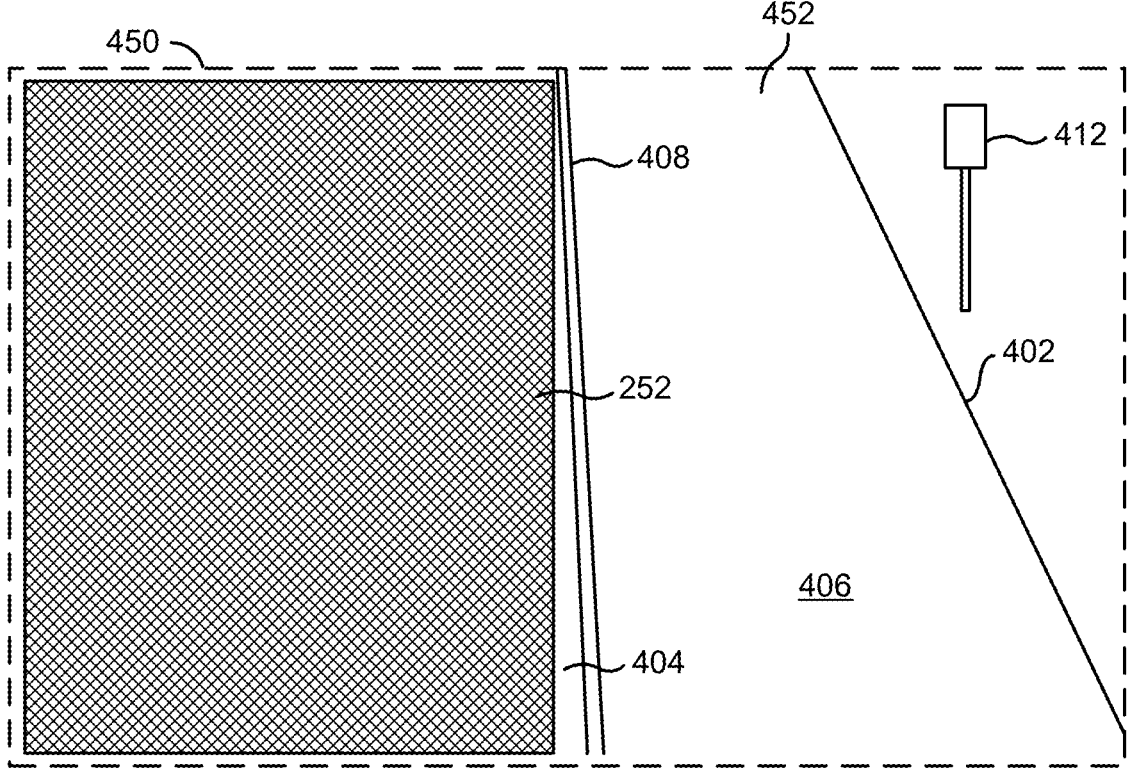
FIG. 10 is a diagram illustrating a video captured during a cleaning process.

Referring to FIG. 10, a diagram illustrating a video captured during a cleaning process is shown. An example video frame 450 is shown. The example video frame 450 may comprise a video frame captured during a cleaning process of the electrostatic cleaning system 210. In the example shown, the example video frame 450 may comprise a video frame captured at a time after the video frame 400 shown in association with FIG. 9 was captured. For example, in the video frame 400, the processor 102 may have detected the presence of the debris 202a-202n on the lens 160 and the processor 102 may have generated the signal CTRL to initiate the cleaning process. In another example, the driver 90 may have provided a manual input (e.g., the signal USR) and the processor 102 may have generated the signal CTRL in response to the signal USR to initiate the cleaning process. In yet another example, the processor 102 may have generated the signal CTRL in response to a particular amount of time for initiating the cleaning process.

A cleaned portion 452 of the video frame 450 is shown. The cleaned portion 452 may comprise a portion of the video frame 450 that may have already been cleaned (or passed over) by the mobile conductive material 252. The road 402, the lane 406, the lane line 408 and the sign 412 are shown in the cleaned portion 452 of the video frame 450. A portion of the lane 404 is shown in the cleaned portion of the video frame 450. The cleaned portion 452 of the video frame 450 is shown without the debris 202a-202n (e.g., no distortions caused by the debris 202a-202n are visible).

The mobile conductive material 252 is shown in the video frame 450. The mobile conductive material 252 may pass over the lens 160 at the offset distance DCON. When the mobile conductive material 252 passes across the lens 160, the attached debris 202a-202n may be attracted to the mobile conductive material 252 and pulled from the lens 160. In the example shown, the mobile conductive material 252 may pass across the lens 160 from right to left. For example, the mobile conductive material 252 may have already passed across the cleaned portion 452 resulting in the debris 202a-202n on the cleaned portion 452 of the video frame being removed (and no longer visible in the video frame 450).

In the example shown, the mobile conductive material 252 may still be in progress moving across the lens 160. Since the mobile conductive material 252 passes in front of the lens 160, the mobile conductive material 252 may temporarily block the field of view of the lens 160. In the example shown, the mobile conductive material 252 may be currently blocking most of the lane 404 and the vehicle 410 driving in the lane 404. In video frames captured after the video frame 450, the mobile conductive material 252 may continue to move to the left side of the video frame 450, the portion of the video frame 450 that may be the cleaned portion 452 may increase, and eventually the mobile conductive material 252 may move out of frame.

The processor 102 may generate the signal CTRL. The power supply 250 may generate the signal ECN and ECP to charge the mobile conductive material 252 and the conductive layer 254. The video frame 450 is shown providing a clear view (e.g., the conductive layer 254 may have a negligible effect on obstructing the capture of the video frames and/or the quality of the video frames). The power supply 250 may generate the signal PTN. The actuator 256 may move the mobile conductive material 252 in response to the signal PTN. The signals ECN and ECP may cause the electric field 306a-306n to be created between the conductive layer 254 and the mobile conductive material 252. The electric field 306a-306n may be created only at locations of the lens 160 where the mobile conductive material 252 is currently located. In the example shown, the electric field 306a-306n may be active in the portion of the video frame 450 with the mobile conductive material 252 (e.g., over the portion of the video frame with the lane 402).

Generally, the actuator 256 may move the mobile conductive material 252 quickly across the lens 160. Any visual obstruction caused by the mobile conductive material 252 may be brief. For example, the mobile conductive material 252 may block portions of the video frame 450 for a small number of consecutive video frames during the cleaning process. In some embodiments, mobile conductive material 252 may be difficult to notice to the human eye while watching the output video frames. In some embodiments, the timing of the mobile conductive material 252 passing over the lens 160 may be set based on a frame rate of the output video. For example, the mobile conductive material 252 may be timed to pass over the lens 160 in between video frames such that the mobile conductive material may not be in the field of view of the lens 160 while any of the video frames are captured.

Figure 11:
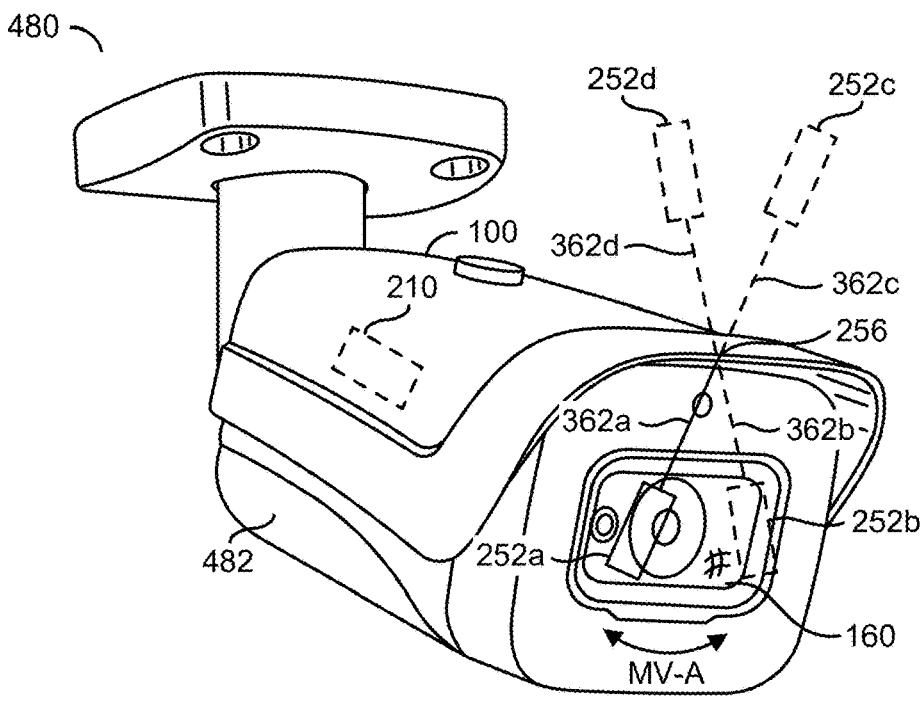
FIG. 11 is a diagram illustrating an example embodiment of the mobile conductive material.

Referring to FIG. 11, a diagram illustrating an example embodiment of the mobile conductive material is shown. An example mobile conductive material implementation 480 is shown. The example mobile conductive material implementation 480 may comprise the camera system 100 implementing the electrostatic cleaning system 210. The lens 160 (or the cover) may comprise the conductive layer 254. The example mobile conductive material implementation 480 may illustrate an example of the electrostatic cleaning process in progress.

A housing 482 of the camera system 100 is shown. The housing 482 may comprise an outer casing of the camera system 100. For example, the components of the camera system 100, such as the electrostatic cleaning system 210, may be implemented within the housing 482. The housing 482 may be a plastic material and/or a metallic material. The housing 482 may provide a protective shell for the components of the camera system 100. In the example shown, the housing 482 may implement a lens hood over the lens 160 to prevent glare from affecting the capture of the light input LIN. The size, shape, color and/or material of the housing 482 may be varied according to the design criteria of a particular implementation.

The actuator 256 is shown located on the housing 482 at a level above the lens 160. In the example shown, the actuator 256 is shown connected to a lens hood of the housing 482 that extends past the lens 160, which may enable the actuator to be offset from the lens 160 by the distance DCON. An armature 362a is shown extending from the actuator 256. The mobile conductive material 252a is shown attached to the armature 362a. For example, the actuator 256 may be at one end of the armature 362a and the mobile conductive material 252a is shown at the end of the armature 362a opposite to the actuator 256.

The force MV-A is shown. In the example shown, the force MV-A is shown as bi-directional. In some embodiments, the actuator 256 may be configured to move the armature 352a back-and-forth (e.g., similar to a pendulum and/or a windshield wiper). An armature 362b with a mobile conductive material 252b is shown as dashed lines to represent an alternate position. In one example, the armature 362a and the mobile conductive material 252a may represent a first position in the cleaning process and the armature 362b and the mobile conductive material 252b may represent a second position in the cleaning process. For example, the signal PTN may be configured to enable the actuator 256 to swing the mobile conductive material from the first position represented by the armature 362a and the mobile conductive material 252a to the second position represented by the armature 362b and the mobile conductive material 252b and then back to the first position represented by the armature 362a and the mobile conductive material 252a (e.g., pendulum-like motion).

In some embodiments, the actuator 256 may be configured to generate the force MV-A in a circular motion. For example, the actuator 256 may generate the circular motion of the armature 362a which may enable the mobile conductive material 252a to spin around (e.g., similar to a propeller). Armatures 362b-362d are shown with respective mobile conductive materials 252b-252d. The armatures 362b-362d and the mobile conductive materials 252b-252d may be illustrated with dashed lines to represent alternate positions. In one example, the armature 362a and the mobile conductive material 252a may represent a first position in the cleaning process and the armatures 362b-362d and the respective mobile conductive materials 252b-252d may represent successive positions in the cleaning process. For example, the signal PTN may be configured to enable the actuator 256 to spin the mobile conductive material 252 from the first position represented by the armature 362a and the mobile conductive material 252a, then to the second position represented by the armature 362b and the mobile conductive material 252b, then to a third position represented by the armature 362c and the mobile conductive material 252c, then to a fourth position represented by the armature 362d and the mobile conductive material 252d and then return to the first position (e.g., propeller-like motion).

In some embodiments, multiple armatures 362a-362d connected to multiple mobile conductive materials 252a-252d may be implemented. For example, each of the armatures 362a-362d may be connected to the actuator 256. Each of the armatures 362a-362d may be connected to a respective one of the mobile conductive materials 252a-252d (e.g., each having a similar implementation). Each implementation of the mobile conductive materials 252a-252d may receive the same charge (e.g., the charge opposite to the charge received by the conductive layer 254). As the actuator 256 spins the armatures 262a-262d, each of the mobile conductive materials 252a-252d may pass over the lens 160 to attract the debris 202a-202n. Implementing multiple armatures 252a-252d with multiple mobile conductive materials 252a-252d may increase a rate of passes over the conductive layer 254 compared to implementing a single mobile conductive material 252. In one example, two of the mobile conductive materials 252a-252b may be implemented. In another example, four of the mobile conductive materials 252a-252d may be implemented. In yet another example, five of the mobile conductive materials 252a-252e may be implemented. The number of the mobile conductive materials 252a-252d implemented may be varied according to the design criteria of a particular implementation.

Figure 12:
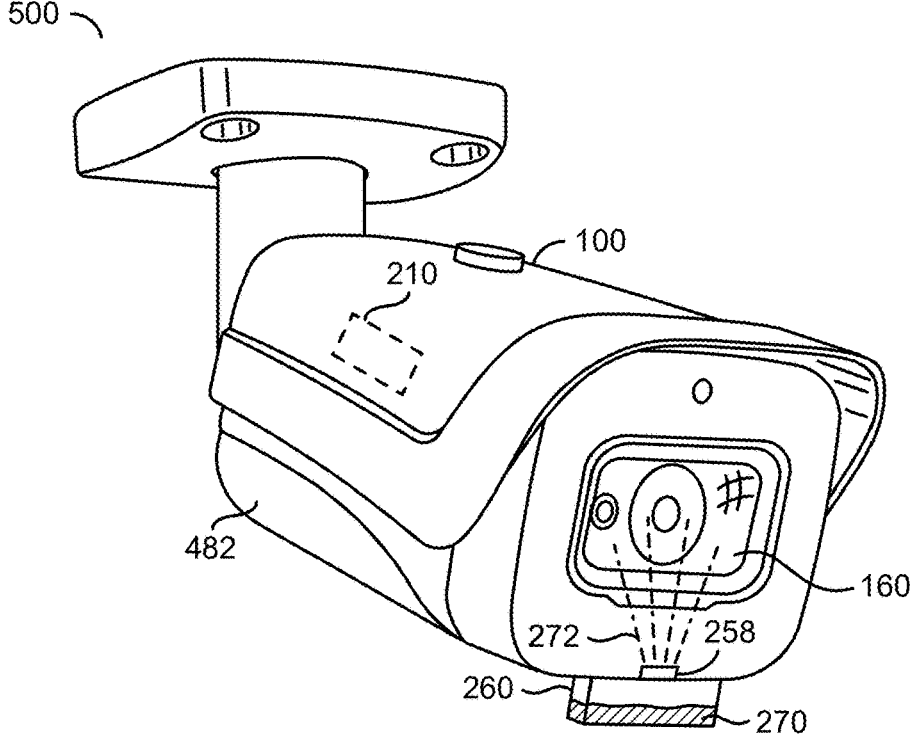
FIG. 12 is a diagram illustrating an example embodiment of the fluid tank and fluid pump.

Referring to FIG. 12, a diagram illustrating an example embodiment of the fluid tank and fluid pump is shown. An example fluid tank and pump implementation 500 is shown. The example fluid tank and pump implementation 500 may comprise the camera system 100 implementing the electrostatic cleaning system 210. The example fluid tank and pump implementation 500 may illustrate an example of the electrostatic cleaning process in a dry environment.

The fluid tank 260 is shown implemented below the lens 160 (or the cover). The fluid 270 is shown within the fluid tank 260. In the example shown, the fluid tank 260 is shown attached to a bottom of the camera housing 482. For example, implementing the fluid tank 260 on the bottom of the housing 482 may enable easy access to refill the fluid 270 in the fluid tank 260 when the camera system 100 is implemented overhead. In some embodiments, the fluid tank 260 may be implemented on a top of the camera system 100 (e.g., on the lens hood of the housing 482 similar to the location of the actuator 256 shown in association with FIG. 11). In some embodiments, the fluid tank 260 may be implemented on one or more sides of the camera system 100. The particular location of the fluid tank 260 may be varied according to the design criteria of a particular implementation.

The fluid pump 258 is shown located next to the fluid tank 260. The fluid pump 258 may be configured to draw the fluid 270 from the fluid tank 260. The fluid pump 258 may be configured to generate the nebulized fluid spray 272. The nebulized fluid spray 272 may be aimed at the lens 160. The nebulized fluid spray 272 may be configured to increase the humidity on the lens 160 and/or the debris 202a-202n in a dry environment. For example, the humidity sensor 164 may be configured to detect the amount of humidity in the air to determine whether to enable the fluid pump 258.

Generally, to clean the debris 202a-202n from the lens 160 directly with the fluid 270 (e.g., without implementing the electrostatic cleaning system 210), high pressure (e.g., mechanical action) may provide sufficient force. The high pressure may be approximately 5-6 bar. The fluid pump 258 may be configured to generate the nebulized fluid spray 272 without high pressure. In an example, the pressure generated by the fluid pump 258 to generate the nebulized fluid spray 272 to increase humidity (e.g., to facilitate the electrostatic cleaning) may be approximately 1 bar. Using lower pressure may enable power savings (e.g., compared to the amount of power consumption for the high pressure). Similarly, the fluid tank 260 may have a lower capacity since the nebulized fluid spray 272 may consume a small amount of the fluid 270 (e.g., compared to the amount of fluid sprayed at high pressure to remove the debris 202a-202n directly). In one example, to implement the electrostatic cleaning system 210 compared to the high pressure spray to remove the debris 202a-202n directly, the capacity of the fluid tank 260 may be approximately 1/10th the fluid capacity. The size of the fluid tank 260 may depend on how isolated the camera system 100 is and/or how often the fluid level may be checked. The capacity of the fluid tank 260, the amount of power consumed and/or the amount of pressure to create the nebulized fluid spray 272 may be varied according to the design criteria of a particular implementation.

Figure 13:
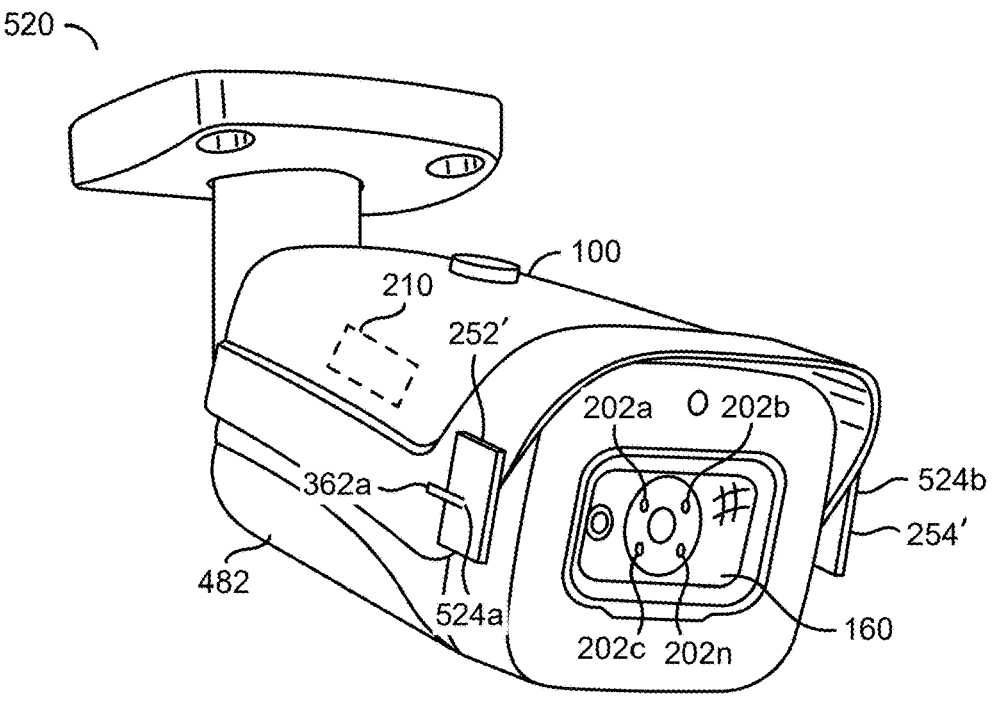
FIG. 13 is a diagram illustrating an example embodiment of the electrostatic cleaning system implementing two movable conductive materials in a default position.

Referring to FIG. 13, a diagram illustrating an example embodiment of the electrostatic cleaning system implementing two movable conductive materials in a default position is shown. A dual-movable conductive material embodiment 520 is shown. The dual-movable conductive material embodiment 520 may illustrate an example of the camera system 100 implementing the electrostatic cleaning system 210 with the dual-movable conductive materials in a default location.

The dual-movable conductive material embodiment 520 may comprise the camera system 100 with the debris 202a-202n on the lens 160. The dual-movable conductive material embodiment 520 may comprise the electrode 252' and the electrode 254'. An armature 362a is shown connecting the electrode 252' to one side of the housing 482 of the camera system 100. In an example, the armature 362a may be connected to the actuator 256 (not shown). From the perspective shown, only the armature 362a may be visible. However, the dual-movable conductive material embodiment 520 may comprise two of the armatures 362a-362b. The armature 362b (not visible from the perspective shown) may be connected to the electrode 254' and the housing 482 of the camera system 100. For example, one or more of the armatures 362a-362b may be controlled by the actuator 256. The armature 362a may be connected to the electrode 252' and the armature 362b may be connected to the electrode 254'. In one example, the armatures 362a-362b may comprise a movable pole. In another example, the armatures 362a-362b may comprise a bendable arm. In another example, the armatures 362a-362b may comprise a telescoping rod. The type of armatures 362a-362b implemented to adjust the position of the electrode 252' and the electrode 254' may be varied according to the design criteria of a particular implementation.

The electrode 252' may comprise a movable conductive material. The movable conductive material 252' may be implemented using a material (e.g., aluminum, copper, iron, etc.) similar to the mobile conductive material 252 described in association with FIG. 6. The movable conductive material 252' may be configured to move near a first side of the lens 160 (or cover). The movable conductive material 252' is shown in a default position 524a. In the default position 524a, the movable conductive material 252' may not be located near the lens 160 (e.g., the default position 524a is shown next to the housing 482 on the side of the camera system 100). For example, in the default position 524a the movable conductive material 252' may be outside of a field of view of the lens 160 (e.g., the movable conductive material 252' may not block incoming light to the lens 160). The movable conductive material 252' may be implemented as one of two electrodes that may be configured to generate an electric field. In the default position 524a, as shown, the movable conductive material 252' may not be powered on and/or may not provide the electric field.

The electrode 254' may comprise a movable conductive material. The movable conductive material 254' may be implemented using a material (e.g., aluminum, copper, iron, etc.) similar to the movable conductive material 252'. The movable conductive material 254' may be configured to move near a second side of the lens 160 (or cover). For example, the movable conductive material 254' may move to an opposite side of the lens 160 than the movable conductive material 252'. For example, the movable conductive material 252' and the movable conductive material 254' may be implemented across from each other. The movable conductive material 254' is shown in a default position 524b. In the default position 524b, the movable conductive material 254' may not be located near the lens 160 (e.g., the default position 524b is shown next to the housing 482 on the side of the camera system 100 opposite to the default position 524a of the movable conductive material 252'). For example, in the default position 524b the movable conductive material 254' may be outside of a field of view of the lens 160 (e.g., the movable conductive material 254' may not block incoming light to the lens 160). The movable conductive material 254' may be implemented as one of two electrodes that may be configured to generate an electric field. In the default position 524b, as shown, the movable conductive material 254' may not be powered on and/or may not provide the electric field.

Figure 14:
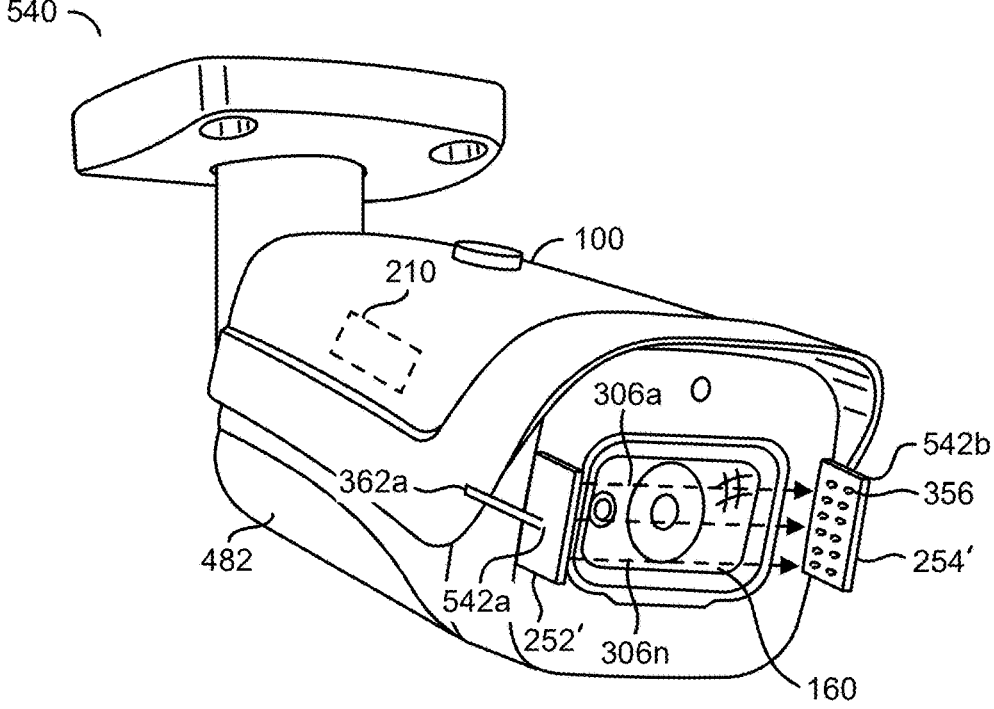
FIG. 14 is a diagram illustrating an example embodiment of the electrostatic cleaning system implementing two movable conductive materials in a cleaning position.

Referring to FIG. 14, a diagram illustrating an example embodiment of the electrostatic cleaning system implementing two movable conductive materials in a cleaning position is shown. A dual-movable conductive material embodiment 540 is shown. The dual-movable conductive material embodiment 540 may illustrate an example of the camera system 100 similar to the embodiment 520 shown in association with FIG. 13, implementing the electrostatic cleaning system 210 but with the dual-movable conductive materials in a debris cleaning location.

The dual-movable conductive material embodiment 540 may comprise the camera system 100 with the debris 202a-202n removed from the lens 160. The dual-movable conductive material embodiment 540 may comprise the movable conductive material 252' and the movable conductive material 254'. The armature 362a is shown connecting the movable conductive material 252' to the housing 482 of the camera system 100. The armature 362a is shown in an extended orientation. For example, the armature 362a may extend to move the movable conductive material 252' from the default position 524a (shown in association with FIG. 13) to a debris cleaning location 542a shown. In one example, the power supply 250 may generate the signal PTN. The actuator 256 may receive the signal PTN and generate the force MV-A. The force MV-A generated by the actuator 256 may result in the armature 362a extending the movable conductive material 252' to the debris cleaning location 542a.

Similarly, the armature 362b (not visible from the perspective shown) may be in an extended orientation to move the movable conductive material 254' to a debris cleaning location 542b. For example, the actuator 256 may receive the signal PTN and generate the force MV-B. The force MV-B generated by the actuator 256 may result in the armature 362b extending the movable conductive material 254' to the debris cleaning location 542b. In some embodiments, each of the armatures 362a-362b may be controlled by an individual actuator (e.g., the power supply 250 may provide power and/or a signal for moving two separate actuators). In one example, the movable conductive material 252' and the movable conductive material 254' may be approximately 0.5 cm to 2 cm apart from each other in the debris cleaning positions 542a-542b.

The power supply 250 may be configured to apply the electrical charge to both the movable conductive material 252' and the movable conductive material 254'. In one example, the power supply 250 may provide the positive charge signal ECP to the movable conductive material 252' and the negative charge signal ECN to the movable conductive material 254'. In another example, the power supply 250 may provide the negative charge signal ECN to the movable conductive material 252' and the positive charge signal ECP to the movable conductive material 254'. The power supply 250 may provide opposite charges to each of the movable conductive material 252' and the movable conductive material 254'. Which of the movable conductive material 252' and the movable conductive material 254' receives which type of charge may be varied according to the design criteria of a particular implementation.

The electrical charge applied to the movable conductive material 252' and the movable conductive material 254' may be configured to generate the electric field 306a-306n. The movable conductive material 252' and the movable conductive material 254' may each implement one electrode for the electric field 306a-306n. The electric field 306a-306n is shown between the movable conductive material 252' and the movable conductive material 254'. In the example embodiment shown, the electric field 306a-306n may have a horizontal orientation. The orientation of the electric field 306a-306n may be dependent upon the location of the movable conductive material 252' and the movable conductive material 254'. In some embodiments, the movable conductive material 252' may be positioned above the lens 160 and the movable conductive material 252' may be positioned below the lens 160 resulting in a vertically oriented electric field 306a-306n. In some embodiments, the movable conductive material 252' and the movable conductive material 254' may be positioned diagonally from each other and the electric field 306a-306n may be oriented diagonally across the lens 160. The location of the debris cleaning locations 542a-542b for the movable conductive material 252' and the movable conductive material 254' and the resulting orientation of the electric field 306a-306n may be varied according to the design criteria of a particular implementation.

The electric field 306a-306n may apply a charge to the debris 202a-202n when located on the lens 160. The charge applied to the debris 202a-202n may be configured to attract the debris 202a-202n from the lens 160 to one of the movable conductive material 252' or the movable conductive material 254'. The attracted debris 356 is shown collected on the movable conductive material 254'. For example, the debris 202a-202n may be removed from the lens 160 by the attraction to the charge on the movable conductive material 254'. In the example shown, the attracted debris 356 may be attracted to the movable conductive material 254'. In some embodiments, the attracted debris 356 may be attracted to the movable conductive material 252'. Whether the attracted debris 356 is pulled onto the movable conductive material 252' or the movable conductive material 254' may depend on the orientation of the electric field 306a-306n, the strength of the electric field 306a-306n, the particular charge on either the movable conductive material 252' and the movable conductive material 254', etc. In the example shown, the electric field 306a-306n may be configured to pull the debris 202a-202n from the lens 160 across the lens 160 to the movable conductive material 254' (shown as the attracted debris 356). In the dual-movable conductive material embodiment 540, the electric field 306a-306n and/or the attractive force may be parallel to the lens 160. Providing the attractive force parallel to the lens 160 may enable the electrostatic cleaning process to remove the debris 202a-202n without either of the movable conductive material 252' or the movable conductive material 254' making physical contact with the lens 160.

The movable conductive material 252' and the movable conductive material 254' may generate the electrostatic charge to enable the debris 202a-202n to be cleaned off the lens 160. The power supply 250 may be configured to generate the signal PTN to move the movable conductive material 252' and the movable conductive material 254' to the respective debris cleaning locations 542a-542b. In the example shown, the debris cleaning locations 542a-542b may be at a location on either side of the lens 160 (e.g., extended past the housing 482 of the camera system 100). When the movable conductive material 252' and the movable conductive material 254' are in the debris cleaning locations 542a-542b, the power supply 250 may provide the signal ECN and the signal ECP to the movable conductive material 252' and the movable conductive material 254' to initiate the cleaning process.

When the movable conductive material 252' and the movable conductive material 254' are in the debris cleaning locations 542a-542b, the field of view of the lens 160 may be partially blocked. In the example shown, the movable conductive material 252' may partially block a right side of the field of view of the lens 160 while the movable conductive material 254' may partially block a left side of the field of view of the lens 160. Generally, the partial blocking of the lens 160 by the movable conductive material 252' and the movable conductive material 254' may be less obstruction than blocking of the lens 160 by the mobile conductive material 252 as shown in association with FIG. 10. When the debris cleaning process is complete, the power supply 250 may generate the signal PTN to move the movable conductive material 252' and the movable conductive material 254' away from the lens 160. For example, the signal PTN may cause the actuator 256 to generate the forces MV-A-MV-B, which may move the armatures 362a-362b and the armatures 362a-362b may pull the movable conductive material 252' and the movable conductive material 254' back to the default locations 524a-524b (e.g., outside of the field of view of the lens 160).

In some embodiments, the movable conductive material 252' and the movable conductive material 254' may be implemented with an alternate default position. In one example, the default positions 524a-524b for the movable conductive material 252' and the movable conductive material 254' may be raised up along the sides of the camera system 100 and the armatures 362a-362b may be configured to rotate to move the movable conductive material 252' and the movable conductive material 254' into the cleaning positions 542a-542b (e.g., the armatures 362a-362b may move from upright in the default positions 524a-524b down to the cleaning positions 542a-542b, similar to railway crossing arms). In another example, the default positions 524a-524b for the movable conductive material 252' and the movable conductive material 254' may be positioned outwards to the sides of the lens 160 (e.g., the movable conductive material 252' and the movable conductive material 254' may be fanned out in a position parallel to the lens 160) and the armatures 362a-362b may be configured to rotate to move the movable conductive material 252' and the movable conductive material 254' into the cleaning positions 542a-542b (e.g., the armatures 362a-362b may move from outwards in the default positions 524a-524b then forwards and inwards to the cleaning positions 542a-542b). The particular locations of the default positions 524a-524b and the type of movement of the armatures 362a-362b to move the movable conductive material 252' and the movable conductive material 254' into the cleaning positions 542a-542b may be varied according to the design criteria of a particular implementation.

Figure 15:
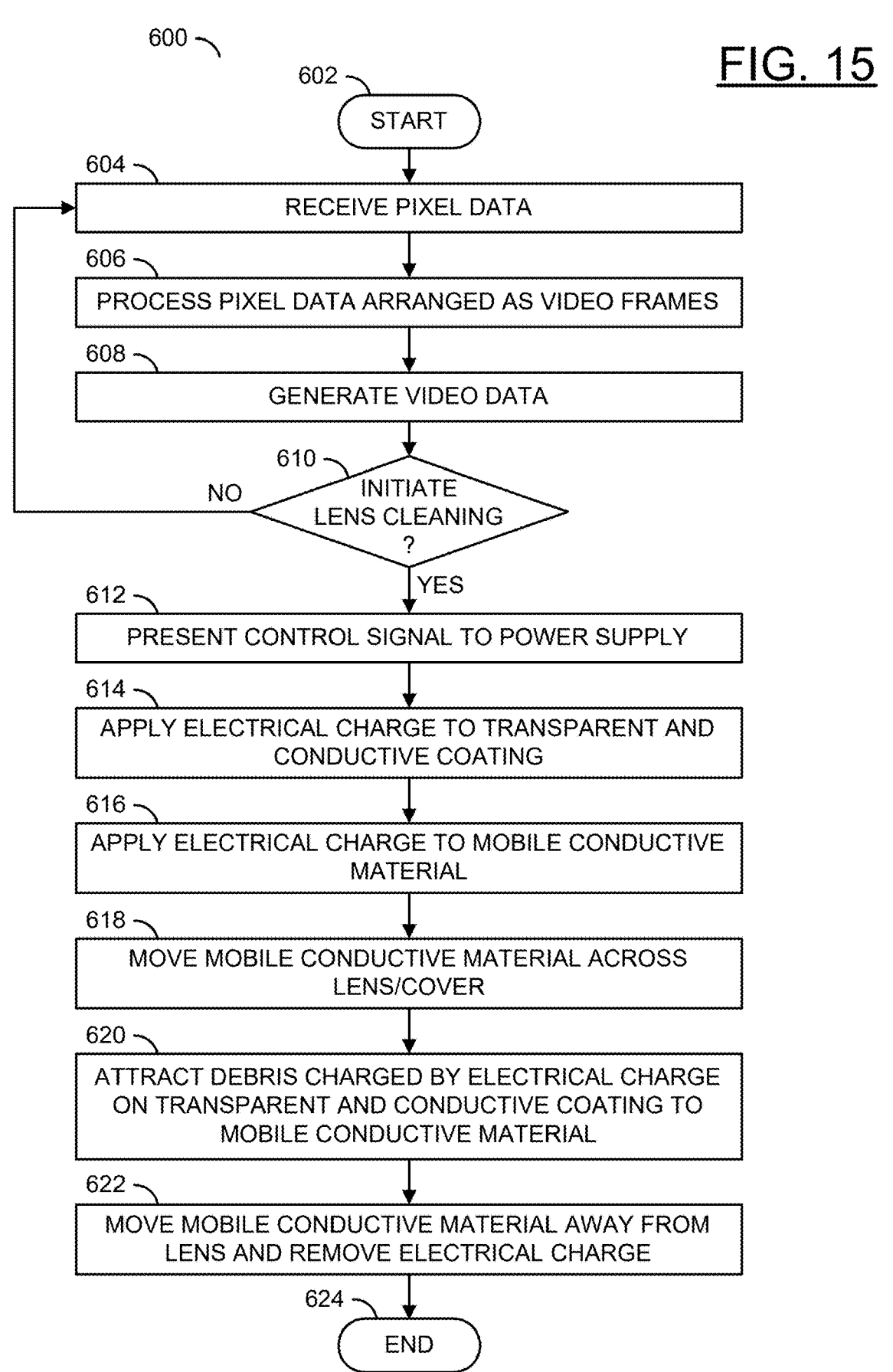
FIG. 15 is a flow diagram illustrating a method for electrostatic debris removal for a camera lens.

Referring to FIG. 15, a method (or process) 600 is shown. The method 600 may implement electrostatic debris removal for a camera lens. The method 600 generally comprises a step (or state) 602, a step (or state) 604, a step (or state) 606, a step (or state) 608, a decision step (or state) 610, a step (or state) 612, a step (or state) 614, a step (or state) 616, a step (or state) 618, a step (or state) 620, a step (or state) 622, and a step (or state) 624.

The step 602 may start the method 600. In the step 604, the processor 102 may receive pixel data. For example, the image sensor 180 may generate the signal VIDEO comprising pixel data in response to the light input LIN captured by the capture device 104. Next, in the step 606, the processor 102 may process the pixel data arranged as video frames. For example, the processor 102 may perform various operations on the pixel data arranged as video frames (e.g., perform computer vision operations, calculate depth data, determine white balance, etc.). In the step 608, the processor 102 may generate the video data. In some embodiments, the video data may be used to determine the presence of the debris 202a-202n (e.g., as shown in association with FIG. 9. Next, the method 600 may move to the decision step 610.

In the decision step 610, the processor 102 may determine whether or not to initiate the lens cleaning process. In one example, the processor 102 may receive a user input to initiate the lens cleaning process. In another example, the processor 102 may perform computer vision operations to detect the presence of the debris 202a-202n. In yet another example, a timer may be used to initiate the lens cleaning process. If the processor 102 determines not to initiate the cleaning process, then the method 600 may return to the step 604. If the processor 102 determines to initiate the cleaning process, then the method 600 may move to the step 612. Generally, the processor 102 may continue to generate the video data even during the cleaning process (e.g., the steps 604-608 may continually be performed regardless of the decision to initiate the cleaning process).

In the step 612, the processor 102 may present the control signal CTRL to the power supply 250. The signal CTRL may be used to initiate the cleaning process. Next, in the step 614, the power supply 250 may apply the electrical charge (e.g., one of the signals ECP or ECN) to the transparent and conductive coating of the conductive layer 254. In the step 616, the power supply 250 may apply the electrical charge (e.g., the opposite one of the signals ECP or ECN applied to the conductive layer 254) to the mobile conductive material 252. Applying the electrical charges may create the electrical field 306a-306n. The electrical field 306a-306n may create the acquired charges 314a-314n on the debris 202a-202n. Next, the method 600 may move to the step 618.

In the step 618, the mobile conductive material 252 may move across the lens (or cover) 160. For example, the power supply 250 may apply the signal PTN to the actuator 256 and the actuator 256 may apply the force MV-A to the mobile conductive material 252. Next, in the step 620, the debris 202a-202n with the acquired charge 314a-314n from the conductive layer 254 may be attracted by the electrical charge on the mobile conductive material 252. In the step 622, the power supply 250 may move the mobile conductive material 252 away from the lens 160 and remove the electrical charge. For example, the signal PTN may move the mobile conductive material 252 across the lens 160 and then back to the default position outside of the field of view of the lens 160. The power supply 250 may remove the signals ECP and ECN from the conductive materials 252-254 after the mobile conductive material 252 has moved back to the default position to drop the debris 202a-202n. Next, the method 600 may move to the step 624. The step 624 may end the method 600.

Figure 16:
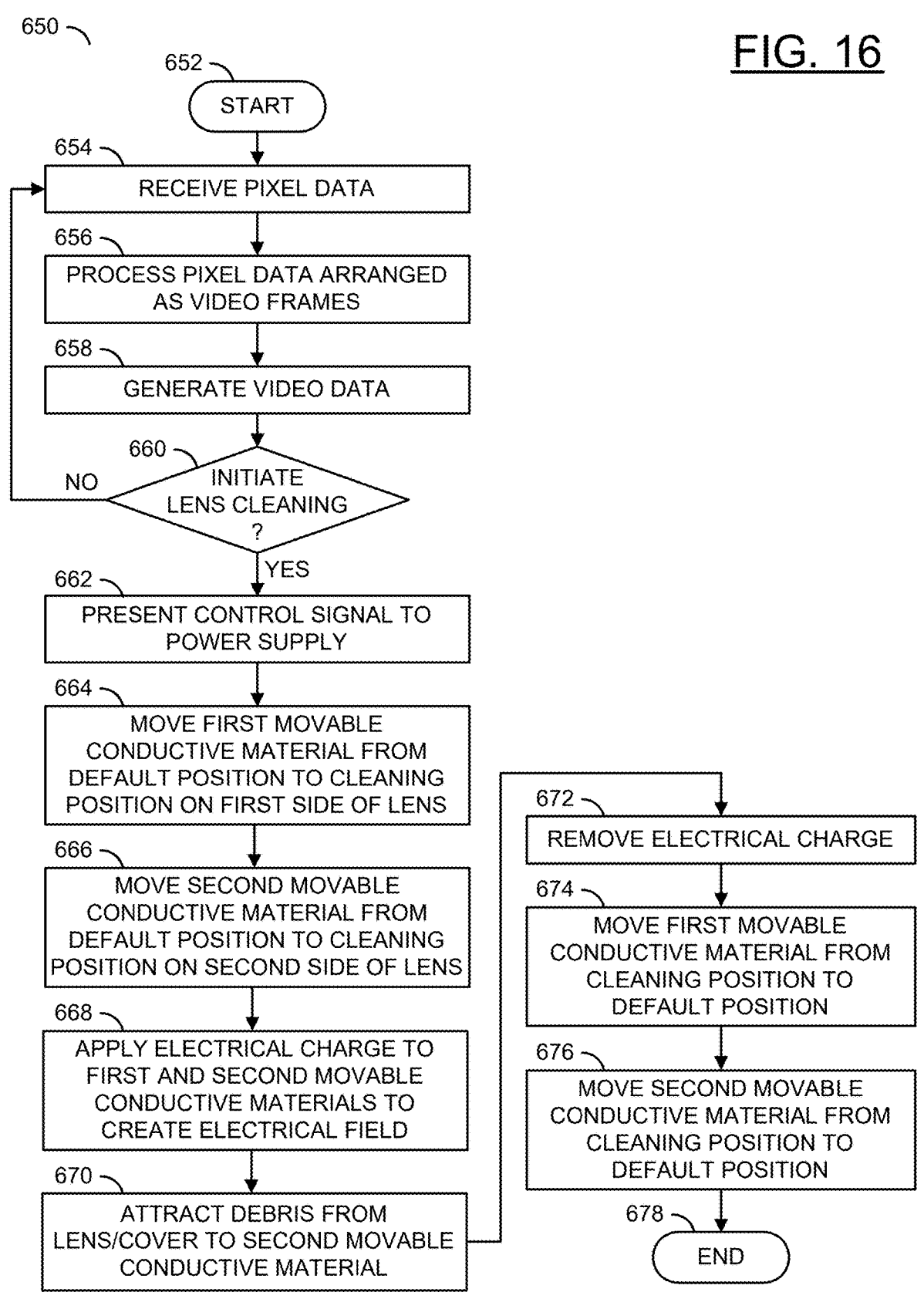
FIG. 16 is a flow diagram illustrating a method for moving electrodes from a default position to a cleaning position for electrostatic debris removal for a camera lens.

Referring to FIG. 16, a method (or process) 650 is shown. The method 650 may move electrodes from a default position to a cleaning position for electrostatic debris removal for a camera lens. The method 650 generally comprises a step (or state) 652, a step (or state) 654, a step (or state) 656, a step (or state) 658, a decision step (or state) 660, a step (or state) 662, a step (or state) 664, a step (or state) 666, a step (or state) 668, a step (or state) 670, a step (or state) 672, a step (or state) 674, a step (or state) 676, and a step (or state) 678.

The step 652 may start the method 650. In the step 654, the processor 102 may receive pixel data. Next, in the step 656, the processor 102 may process the pixel data arranged as video frames. In the step 658, the processor 102 may generate the video data. Next, the method 650 may move to the decision step 660.

In the decision step 660, the processor 102 may determine whether or not to initiate the lens cleaning process. If the processor 102 determines not to initiate the cleaning process, then the method 650 may return to the step 654. If the processor 102 determines to initiate the cleaning process, then the method 650 may move to the step 662. Generally, the processor 102 may continue to generate the video data even during the cleaning process (e.g., the steps 654-658 may continually be performed regardless of the decision to initiate the cleaning process).

In the step 662, the processor 102 may present the control signal CTRL to the power supply 250. The signal CTRL may be used to initiate the cleaning process. Next, in the step 664, the movable conductive material 252' may be moved from the default position 524a (e.g., as shown in association with FIG. 13) to the cleaning position 542a (e.g., as shown in association with FIG. 14). For example, the power supply 250 may generate the signal PTN and the actuator 256 may cause the armature 362a to move (e.g., the force MV-A) from the default position 524a to the cleaning position 542a. In the step 666, the movable conductive material 254' may be moved from the default position 524b (e.g., as shown in association with FIG. 13) to the cleaning position 542b (e.g., as shown in association with FIG. 14) on one side of the lens 160 (e.g., on a left side of the lens 160). For example, the power supply 250 may generate the signal PTN and the actuator 256 may cause the armature 362b to move (e.g., the force MV-B) from the default position 524b to the cleaning position 542b on the opposite side of the lens 160 (e.g., on a right side of the lens 160). Next, in the step 668, the power supply 250 may apply the electrical charge (e.g., the signal ECP) to the movable conductive material 252' and the opposite electrical charge (e.g., the signal ECN) to the movable conductive material 254' to create the electrical field 306a-306n parallel to the lens 160. In the step 670, the debris 202a-202n may be attracted from the lens 160 (or the cover) to the movable conductive material 254' (e.g., by the attractive forces 316a-316n). Next, the method 650 may move to the step 672.

In the step 672, the power supply 250 may remove the electrical charges (e.g., the signals ECP and ECN) from the movable conductive materials 252'-254'. Next, in the step 674, the movable conductive material 252' may be moved from the cleaning position 542a (e.g., as shown in association with FIG. 14) to the default position 524a (e.g., as shown in association with FIG. 13). For example, the power supply 250 may generate the signal PTN and the actuator 256 may cause the armature 362a to move (e.g., the force MV-A) from the cleaning position 542a to the default position 524a (e.g., outside of the field of view of the lens 160). In the step 676, the movable conductive material 254' may be moved from the cleaning position 542b (e.g., as shown in association with FIG. 14) to the default position 524b (e.g., as shown in association with FIG. 13). For example, the power supply 250 may generate the signal PTN and the actuator 256 may cause the armature 362b to move (e.g., the force MV-B) from the cleaning position 542b to the default position 524b (e.g., outside of the field of view of the lens 160). Next, the method 650 may move to the step 678. The step 678 may end the method 650.

Figure 17:
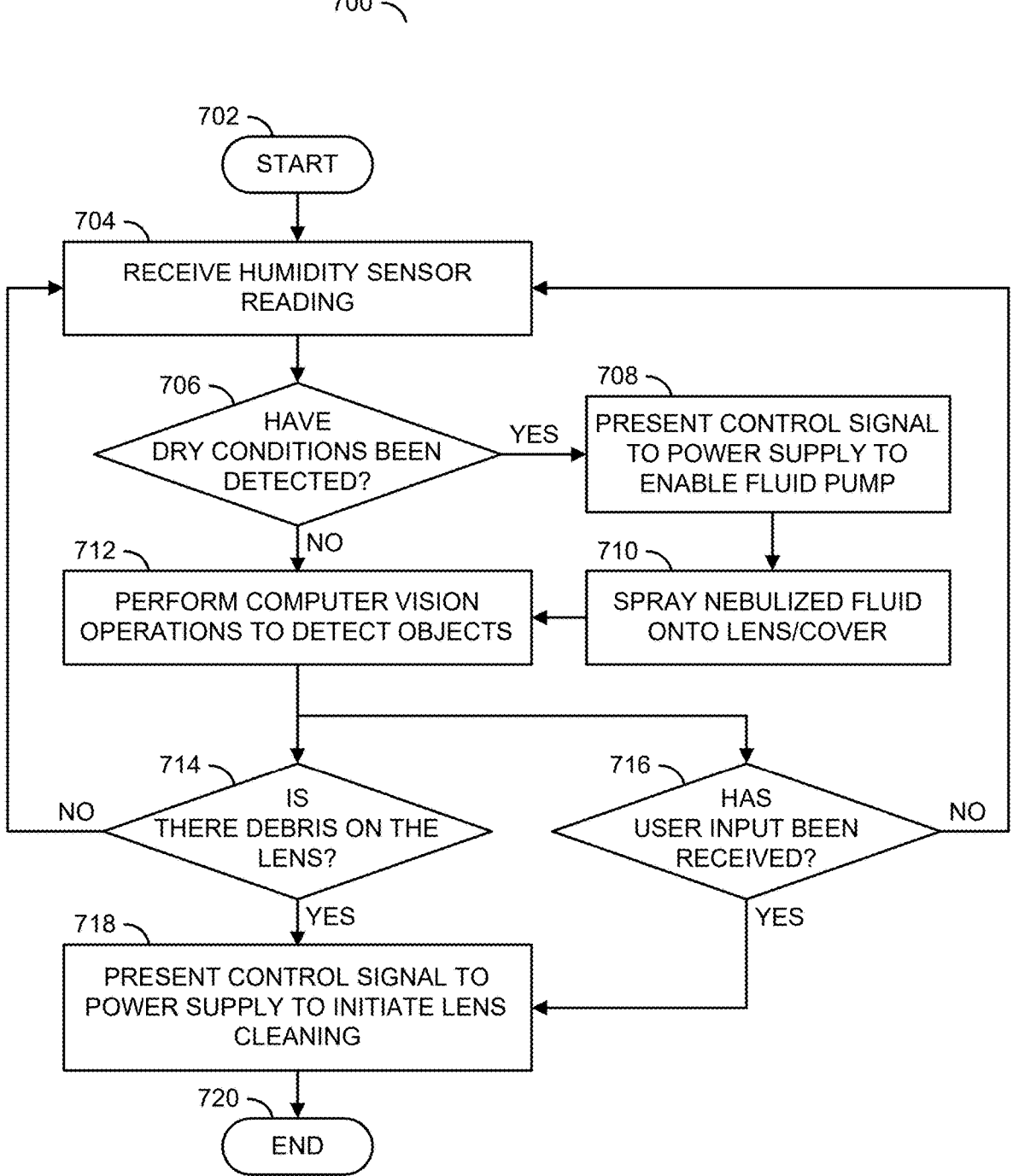
FIG. 17 is a flow diagram illustrating a method for enabling a nebulized fluid and for initiating a cleaning process.

Referring to FIG. 17, a method (or process) 700 is shown. The method 700 may enable a nebulized fluid and initiate a cleaning process. The method 700 generally comprises a step (or state) 702, a step (or state) 704, a decision step (or state) 706, a step (or state) 708, a step (or state) 710, a step (or state) 712, a decision step (or state) 714, a decision step (or state) 716, a step (or state) 718, and a step (or state) 720.

The step 702 may start the method 700. In the step 704, the processor 102 may receive a reading from the humidity sensor 164. For example, the humidity sensor 164 may present the signal SENS comprising a reading that indicates an amount of moisture in the environment 70. Next, the method 700 may move to the decision step 706.

In the decision step 706, the processor 102 may determine whether dry conditions have been detected. In an example, the processor 102 may compare the reading from the humidity sensor 164 to a threshold value that may be used to indicate dry conditions in the environment 70. If dry conditions have been detected, then the method 700 may move to the step 708. In the step 708, the processor 102 may present the fluid control signal FCTL to the power supply 250 to enable the fluid pump 258. For example, the power supply 250 may present the signal NEB to the fluid pump 258 in response to the signal FCTL. Next, in the step 710 the fluid pump 258 may spray the nebulized fluid 272 onto the lens 160 (or cover). The nebulized fluid 272 may increase a moisture of the debris 202a-202n, which may facilitate the charge 314a-314n and/or the attractive forces 316m-316n on for the debris 202a-202n. Next, the method 700 may move to the step 712. In the decision step 706, if the dry conditions have not been detected, then the method 700 may move to the step 712. In the step 712, the processor 102 may perform computer vision operations to detect objects. Next, the method 700 may move to the decision step 714 and the decision step 716.

In the decision step 714, the processor 102 may determine whether the debris 202a-202n is on the lens 160. For example, the computer vision operations may be performed to detect the objects 420a-420b classified as the debris 202a-202n. In an example, the processor 102 may determine an amount of the debris 202a-202n on the lens 160 in response to the computer vision operations (e.g., a percentage of blockage, an amount of impact that the blockage may have on detecting other objects, a threshold number of debris particles, etc.). If there is no debris on the lens 160 (or an insufficient amount of the debris 202a-202n to initiate the cleaning process), then the method 700 may return to the step 704. If there is debris on the lens, then the method 700 may move to the step 718.

In the decision step 716, the processor 102 may determine whether the user input has been received. For example, the HID 166 may generate the signal USR in response to input from a user that may initiate the cleaning process. In one example, the vehicle 80 may comprise a button that the driver 90 may press the button to provide the signal USR to initiate the cleaning process. If the user input has not been received, then the method 700 may return to the step 704. If the user input has been received, then the method 700 may move to the step 718. In an example, the cleaning process may be initiated by either one of the computer vision operations detecting the debris 202a-202n, the user input and/or a timer.

In the step 718, the processor 102 may present the control signal CTRL to the power supply 250 to initiate the lens cleaning. For example, the signal CTRL may be generated in response to the signal USR and/or the computer vision operations. Next, the method 700 may move to the step 720. The step 720 may end the method 700.

Referring to FIG. 18, a method (or process) 750 is shown. The method 750 may learn a position for a mobile conductive material and a voltage for debris removal. The method 750 generally comprises a step (or state) 752, a step (or state) 754, a step (or state) 756, a decision step (or state) 758, a step (or state) 760, a step (or state) 762, a step (or state) 764, a step (or state) 766, a decision step (or state) 768, and a step (or state) 770.

The step 752 may start the method 750. In the step 754, the processor 102 may set the distance DCON for the mobile conductive material 252 from the lens 160. In one example, the distance DCON may be initiated at a default distance between 0.5 cm to 2 cm. In another example, the distance DCON may be set according to a previous cleaning cycle. Next, in the step 756, the processor 102 may capture and/or analyze the video data. Next, the method may move to the decision step 758.

In the decision step 758, the processor 102 may determine whether or not to initiate the cleaning process. For example, the cleaning process may be initiated in response to the signal USR, a timer and/or based on the debris 202a-202n detected on the lens 160 by the computer vision operations. If the cleaning process is not initiated, then the method 750 may return to the step 756. If the cleaning process is initiated, then the method 750 may move to the step 760. In the step 760, the processor 102 and/or the power supply 250 may provide the signal PTN to move the mobile conductive material 252 to the previously set distance DCON from the lens 160. Next, in the step 762, the power supply 250 may apply a voltage to the mobile conductive material 252 and the conductive layer 254. The voltage applied may be a difference between the voltage in the signals ECP and ECN. The voltage applied may initially be a default value. In the step 764, the mobile conductive material 252 and the conductive layer 254 may perform the cleaning process (e.g., the mobile conductive material 252 may move across the lens 160 while the electric field 306a-306n is generated). Next, in the step 766, the processor 102 may analyze the results of the cleaning process. For example, the processor 102 may perform the computer vision operations to determine the amount of debris 202a-202n remaining on the lens 160 after the cleaning process. Next, the method 750 may move to the decision step 768.

In the decision step 768, the processor 102 may determine whether or not to adjust the distance DCON and/or the voltage applied to the conductive materials 252-254. In one example, the processor 102 may compare a number of particles of the debris 202a-202n before and after the cleaning process. In another example, the processor 102 may compare a blockage percentage of the lens 160 before and after the cleaning process. Based on an effectiveness of the cleaning process, the processor 102 may determine to adjust the distance DCON and/or the voltage. For example, if the cleaning process was inadequate, adjustments may be made. In another example, if the cleaning process was performed adequately, the adjustments may be made to conserve power. If no adjustments are determined to be made, then the method 750 may return to the step 754. If adjustments are determined to be made, then the method 750 may move to the step 770.

In the step 770, the processor 102 may update the distance value DCON and/or the voltage to apply for a next iteration of the cleaning process. For example, if the processor 102 determines that too much of the debris 202a-202n is remaining on the lens 160 after the cleaning process, the processor 102 may reduce the distance DCON and/or increase the voltage, which may help more of the debris 202a-202n to be attracted to the mobile conductive material 252. In another example, if the processor 102 determines that the cleaning process adequately removed the debris 202a-202n, the processor 102 may attempt to conserve power on a next iteration of the cleaning process. For example, the effectiveness may be similarly effective with a reduced voltage, which may conserve power. If reducing the voltage in the next iteration results in less effective cleaning, then the voltage may be increased back to the previous value (or the distance DCON may be reduced). The processor 102 may iteratively adjust the distance DCON and/or the voltage to determine a balance between power consumption and effectiveness at removing the debris 202a-202n. Next, the method 750 may return to the step 754 (e.g., to perform a next iteration of the cleaning process).

The functions performed by the diagrams of FIGS. 1-18 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"–"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"– "n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

a cover for a camera sensor comprising a transparent and conductive coating;

a conductive material configured to move near said cover; and a power source configured to apply an electrical charge to said cover and said conductive material, wherein (i) said electrical charge applied to said cover and said conductive material is configured to generate an electric field between said cover and said conductive material, (ii) said cover implements a first electrode for said electric field and said conductive material implements a second electrode for said electric field, (iii) said electric field is configured to apply a charge to a plurality of debris on said cover, and (iv) said charge applied to said plurality of debris is configured to attract said plurality of debris from said cover to said conductive material.

2. The apparatus according to claim 1, wherein said apparatus is configured to generate an electrostatic charge configured to clean said plurality of debris off said cover.

3. The apparatus according to claim 1, wherein said plurality of debris comprises dust particles.

4. The apparatus according to claim 1, wherein said conductive material is aluminum.

5. The apparatus according to claim 1, wherein said electrical charge applied comprises a voltage high enough to overcome gravitational forces and van der Waals forces.

6. The apparatus according to claim 1, wherein said cover is a camera lens.

7. The apparatus according to claim 1, wherein said cover comprises a transparent material configured to protect said camera sensor in an outdoor environment.

8. The apparatus according to claim 1, wherein said conductive material is configured to be moved above said cover and said electrical charge is configured to enable a vertical force configured to pull said plurality of debris from said cover.

9. The apparatus according to claim 1, wherein said conductive material is moved near said cover to initiate a cleaning process and said conductive material is moved away from said cover when said cleaning process is finished.

10. The apparatus according to claim 1, further comprising a processor configured to (i) process pixel data arranged as video frames captured by said camera sensor, (ii) perform computer vision operations on said video frames to detect objects, (iii) determine whether said objects comprise said plurality of debris on said cover and (iv) generate a control signal to enable said power source to apply said electrical charge in response to determining that said plurality of debris is on said cover.

11. The apparatus according to claim 1, further configured to receive a control signal, wherein (i) said control signal is configured to enable said power source to apply said electrical charge and (ii) said control signal is generated in response to a manual input.

12. The apparatus according to claim 1, further comprising a low pressure fluid pump configured to spray a fluid on said cover.

13. The apparatus according to claim 12, wherein said fluid sprayed on said cover comprises a nebulized fluid.

14. The apparatus according to claim 12, wherein said fluid is water.

15. The apparatus according to claim 12, wherein (i) spraying said fluid on said cover is configured to increase a moisture of said debris, (ii) said charge applied to said debris is increased in response to said increase of said moisture, and (iii) said attraction of said plurality of debris from said cover to said conductive material is increased in response to said increase of said charge applied to said debris.

16. The apparatus according to claim 12, wherein said low pressure fluid pump is configured to spray said fluid on said cover in response to a detection of a dry environment.

17. An apparatus comprising:

a cover for a camera sensor;

a first conductive material configured to move near a first side of said cover;

a second conductive material configured to move near a second side of said cover; and a power source configured to apply an electrical charge to said first conductive material and said second conductive material, wherein (i) said electrical charge applied to said first conductive material and said second conductive material is configured to generate an electric field between said first conductive material and said second conductive material, (ii) said first conductive material implements a first electrode for said electric field and said second conductive material implements a second electrode for said electric field, (iii) said electric field is configured to apply a charge to a plurality of debris on said cover, and (iv) said charge applied to said plurality of debris is configured to attract said plurality of debris from said cover to said second conductive material.

18. The apparatus according to claim 17, wherein (i) said first conductive material is configured to be moved near said first side of said cover and said second conductive material is configured to be moved near said second side of said cover in response to a control signal to initiate a cleaning process and (ii) said first conductive material and said second conductive material are each moved away from said cover when said cleaning process is finished.

19. The apparatus according to claim 17, wherein said electric field is configured to pull said plurality of debris horizontally across said cover to said second conductive material.

20. The apparatus according to claim 17, wherein said apparatus is configured to generate an electrostatic charge configured to clean said plurality of debris off said cover.

* * * * *